United States Patent
Taoka et al.

(10) Patent No.: US 7,427,308 B2
(45) Date of Patent: Sep. 23, 2008

(54) HONEYCOMB FILTER FOR EXHAUST GAS DECONTAMINATION AND EXHAUST GAS DECONTAMINATION APPARATUS

(75) Inventors: Noriyuki Taoka, Ibi-gun (JP); Yukio Oshimi, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 463 days.

(21) Appl. No.: 10/506,438

(22) PCT Filed: Mar. 4, 2003

(86) PCT No.: PCT/JP03/02519

§ 371 (c)(1),
(2), (4) Date: Mar. 22, 2005

(87) PCT Pub. No.: WO03/074848

PCT Pub. Date: Sep. 12, 2003

(65) Prior Publication Data

US 2005/0160710 A1    Jul. 28, 2005

(30) Foreign Application Priority Data

Mar. 4, 2002    (JP)    ............................. 2002-057887

(51) Int. Cl.
*B01D 24/00*    (2006.01)
*B01D 34/00*    (2006.01)
*B01D 46/00*    (2006.01)
*B01D 53/34*    (2006.01)

(52) U.S. Cl. ............................. 55/523; 55/522; 95/273; 422/180

(58) Field of Classification Search ............... 55/523, 55/522; 95/273; 422/180; 180/273
See application file for complete search history.

(56) References Cited

U.S. PATENT DOCUMENTS 4,364,760 A * 12/1982 Higuchi et al. ................ 55/523

(Continued)

FOREIGN PATENT DOCUMENTS

DE    199 57 311 A1    5/2000

(Continued)

OTHER PUBLICATIONS

U.S. Appl. No. 10/506,438, filed Sep. 2, 2004, Taoka et al.

(Continued)

*Primary Examiner*—Walter D. Griffin
*Assistant Examiner*—Amber Miller Harris
(74) *Attorney, Agent, or Firm*—Oblon, Spivak, McClelland, Maier & Neustadt, P.C.

(57) ABSTRACT

A honeycomb filter for purifying exhaust gases that can almost completely burn and remove particulates accumulated on a wall portion by a regenerating process allowing residual ashes on the wall portion to easily move inside a through hole because the ashes are easily separated from the wall portion. In the honeycomb filter a columnar body made of porous ceramics, having parallel through holes in the length direction with a wall portion interposed therebetween, is designed so that part or all of the wall portion that separates the through holes from each other functions as a filter collecting particulates, wherein a length l of the longest side in a cross section perpendicular to the length direction of the through hole and a length L in the length direction of the columnar body satisfy: $60 \leq L/l \leq 500$ and a surface roughness Ra (according to JIS B 0601) of the through hole inner wall satisfies: $Ra \leq 100$ μm

12 Claims, 10 Drawing Sheets

U.S. PATENT DOCUMENTS

| | | | |
|---|---|---|---|
| 5,545,243 A | | 8/1996 | Kotani et al. |
| 5,733,352 A | * | 3/1998 | Ogawa et al. .................. 55/523 |
| 5,853,459 A | * | 12/1998 | Kuwamoto et al. ........... 95/273 |
| 5,914,187 A | | 6/1999 | Naruse et al. |
| 5,930,994 A | | 8/1999 | Shimato et al. |
| 6,447,564 B1 | | 9/2002 | Ohno et al. |
| 6,565,630 B2 | | 5/2003 | Ohno et al. |
| 6,669,751 B1 | * | 12/2003 | Ohno et al. .................... 55/523 |
| 6,770,116 B2 | | 8/2004 | Kojima |
| 2002/0029548 A1 | | 3/2002 | Ohno et al. |
| 2004/0223892 A1 | | 11/2004 | Kojima |
| 2005/0159310 A1 | | 7/2005 | Ohno et al. |
| 2005/0160710 A1 | | 7/2005 | Taoka et al. |
| 2005/0176581 A1 | | 8/2005 | Ohno et al. |
| 2005/0214504 A1 | | 9/2005 | Yoshida |
| 2005/0229565 A1 | | 10/2005 | Yoshida |
| 2005/0247038 A1 | | 11/2005 | Takahashi |
| 2005/0272602 A1 | | 12/2005 | Ninomiya |
| 2006/0019061 A1 | | 1/2006 | Oshimi |
| 2006/0029897 A1 | | 2/2006 | Saijo et al. |
| 2006/0029898 A1 | | 2/2006 | Saijo et al. |
| 2006/0043652 A1 | | 3/2006 | Saijo et al. |
| 2006/0059877 A1 | | 3/2006 | Yoshida |
| 2006/0172113 A1 | | 8/2006 | Kunieda |
| 2006/0210765 A1 | | 9/2006 | Ohno et al. |
| 2006/0216466 A1 | | 9/2006 | Yoshida |
| 2006/0216467 A1 | | 9/2006 | Yoshida |
| 2006/0222812 A1 | | 10/2006 | Koyama et al. |
| 2006/0225390 A1 | | 10/2006 | Yoshida |
| 2006/0228521 A1 | | 10/2006 | Ohno et al. |
| 2006/0230732 A1 | | 10/2006 | Kunieda |
| 2006/0254231 A1 | | 11/2006 | Hayashi et al. |
| 2007/0068128 A1 | | 3/2007 | Oshimi et al. |
| 2007/0128405 A1 | | 6/2007 | Sakaguchi et al. |
| 2007/0130897 A1 | | 6/2007 | Sakaguchi et al. |
| 2007/0169453 A1 | | 7/2007 | Hayakawa et al. |
| 2007/0190289 A1 | | 8/2007 | Fujita |
| 2007/0190350 A1 | | 8/2007 | Ohno et al. |

FOREIGN PATENT DOCUMENTS

| | | | |
|---|---|---|---|
| EP | 0 990 777 | | 4/2000 |
| JP | 63-7814 | | 1/1988 |
| JP | 2-146212 | | 6/1990 |
| JP | 5-302507 | | 11/1993 |
| JP | 6-193431 | | 7/1994 |
| JP | 07-163823 | | 6/1995 |
| JP | 8-28248 | | 1/1996 |
| JP | 10-52618 | | 2/1998 |
| JP | 2000-167329 | | 6/2000 |
| JP | 200196117 A | * | 4/2001 |
| JP | 2001-286725 | | 10/2001 |
| JP | 2002-20174 | | 1/2002 |
| JP | 2003-001029 | | 1/2003 |

OTHER PUBLICATIONS

U.S. Appl. No. 10/502,044, filed Jul. 29, 2004, Taoka et al.
U.S. Appl. No. 10/504,987, filed Aug. 19, 2004, Kojima.
U.S. Appl. No. 10/508,415, filed Sep. 21, 2004, Shibata.
U.S. Appl. No. 10/510,344, filed Oct. 6, 2004, Ohno.
U.S. Appl. No. 10/506,247, filed Sep. 9, 2004, Kudo.
U.S. Appl. No. 10/509,578, filed Sep. 29, 2004, Yamada.
U.S. Appl. No. 10/507,375, filed Sep. 21, 2004, Ohno et al.
U.S. Appl. No. 10/509,688, filed Oct. 12, 2004, Yamada.
U.S. Appl. No. 10/986,227, filed Nov. 12, 2004, Ono et al.
U.S. Appl. No. 10/513,798, filed Nov. 8, 2004, Kunieda et al.
U.S. Appl. No. 10/515,179, filed Nov. 26, 2004, Yamada.
U.S. Appl. No. 10/515,181, filed Nov. 26, 2004, Komori et al.
U.S. Appl. No. 10/514,560, filed Nov. 30, 2004, Ohno et al.
U.S. Appl. No. 10/516,328, filed Dec. 14, 2004, Komori et al.
U.S. Appl. No. 10/518,373, filed Dec. 28, 2004, Ohno et al.
U.S. Appl. No. 11/033,151, filed Jan. 12, 2005, Ohno et al.
U.S. Appl. No. 09/926,795.
U.S. Appl. No. 10/671,418, filed Sep. 26, 2003 Ohno et al.
U.S. Appl. No. 10/129,126.
U.S. Appl. No. 10/362,975, filed Oct. 1, 2001, Ohno et al.
U.S. Appl. No. 10/296,027, filed Mar. 20, 2002, Kojima.
U.S. Appl. No. 10/477,741, filed May 31, 2002, Taoka et al.
U.S. Appl. No. 10/490,206, filed Mar. 29, 2004, Hong et al.
U.S. Appl. No. 10/490,205, filed Mar. 29, 2004, Komori et al.
U.S. Appl. No. 10/493,056, filed Apr. 29, 2004, Hong et al.
U.S. Appl. No. 10/502,045, filed Jul. 29, 2004, Kudo et al.
U.S. Appl. No. 10/502,054, filed Jul. 30, 2004, Kudo et al.
U.S. Appl. No. 11/476,929.
U.S. Appl. No. 11/496,431.
U.S. Appl. No. 11/513,149.
U.S. Appl. No. 11/518,998.
U.S. Appl. No. 11/600,775.
U.S. Appl. No. 11/600,784.
U.S. Appl. No. 10/506,438, filed Mar. 22, 2005, Taoka, et al.
U.S. Appl. No. 11/626,158, filed Jan. 23, 2007, Ohno et al.
Patent Abstracts of Japan, JP 2000-279729, Oct. 10, 2000.
U.S. Appl. No. 10/521,592, filed Jan. 18, 2005, Ohno et al.
U.S. Appl. No. 11/225,197.
U.S. Appl. No. 10/518,548 filed, Jan. 3, 2005, Takahashi.
U.S. Appl. No. 10/527,531, filed Mar. 11, 2005, Ogyu et al.
U.S. Appl. No. 10/530,561 filed Apr. 7, 2005, Komori et al.
U.S. Appl. No. 11/174,726, filed Jul. 6, 2005, Ohno et al.
U.S. Appl. No. 11/174,483, filed Jul. 6, 2005, Saijo et al.
U.S. Appl. No. 11/760,037.
U.S. Appl. No. 11/683,698.
U.S. Appl. No. 10/506,438, filed Mar. 22, 2005, Taoka et al.

* cited by examiner (a)

(b)

Cross-sectional view taken along line B-B (a)

Inlet    Middle    Outlet (b)

Inlet    Middle    Outlet

HONEYCOMB FILTER FOR EXHAUST GAS DECONTAMINATION AND EXHAUST GAS DECONTAMINATION APPARATUS

CROSS REFERENCE TO RELATED APPLICATION

This application claims benefit of priority to Japanese Patent Application No. 2002-57887, filed on Mar. 4, 2002, the contents of which are incorporated by reference herein.

TECHNICAL FIELD

The present invention relates to a honeycomb filter for purifying exhaust gases that is used as a filter for removing particulates and the like contained in exhaust gases discharged from an internal combustion engine such as a diesel engine or the like, and an exhaust gas purifying device using the honeycomb filter for purifying exhaust gases.

BACKGROUND ART

In recent years, PMs (particulate matters, hereinafter, referred to as particulates) contained in exhaust gases discharged from inner combustion engines of vehicles such as buses, trucks or the like and construction machines and the like have raised serious problems since those particulates are harmful to the environment and the human body.

There have been proposed various ceramic filters which allow exhaust gases to pass through porous ceramics and collect particulates in the exhaust gases to purify the exhaust gases.

Conventionally, with respect to the ceramic filter of this type, there have been proposed honeycomb filters which have a structure in that a number of through holes are placed in parallel with one another in one direction and wall portion that separate the through holes from each other are allowed to function as filters. In other words, each of the through holes formed in the ceramic filter is sealed with a plug at either of ends of its exhaust gas inlet side and outlet side so that exhaust gases that have entered one through hole are discharged from another through hole after having always passed through each wall portion that separates the through holes.

An exhaust gas purifying device has a structure in that the honeycomb filter having the above-mentioned arrangement is provided in an exhaust gas passage of an internal combustion engine, and when particulates in exhaust gases discharged from the internal combustion engine are made to pass through the honeycomb filter, the particulates are captured by the wall portion so that the exhaust gases are purified.

As such a purifying process for exhaust gases progresses, particulates are gradually accumulated on the partition wall that separates the through holes of the ceramic filter to cause clogging and the subsequent interruption in gas permeability. For this reason, the above-mentioned ceramic filter needs to be subjected to a regenerating process regularly by allowing gases heated by a heating means such as a heater or the like to flow through the through hole so as to burn and remove the particulates that cause the clogging.

In such a regenerating process of the conventional honeycomb filter, however, it is difficult to completely burn and remove particulates accumulated on the partition wall, and the regenerating process of the honeycomb filter causes residual ash components (ashes) derived from metal components of the particulates on the partition wall. Normally, these ashes remain over the almost entire face of the wall portion in an even state, and the conventional honeycomb filter causes a difficulty in separating the ashes from the wall portion, and can hardly move the ashes inside the through hole by using gases that enter the through hole in the regenerating process of the honeycomb filter (see FIGS. 9(a) to 9(c)).

Here, FIG. 9(a) is a cross-sectional photograph that shows a cross-section of such a honeycomb filter taken in parallel with the length direction, FIG. 9(b) shows partially enlarged cross-sectional photographs that show cross-sections of the honeycomb filter of FIG. 9(a) in the vicinity of the exhaust gas inlet side, the center portion and the exhaust gas outlet side, and FIG. 9(c) shows partially enlarged cross-sectional photographs perpendicular to the length direction in the vicinity of the exhaust gas inlet side, the center portion and the exhaust gas outlet side of the honeycomb filter. In the above-mentioned honeycomb filter, it is confirmed that white ashes remain over the almost entire face of the partition wall.

For this reason, in the case where particulate collecting process is carried out by using the exhaust gas purifying device using the conventional honeycomb filter, since the regenerating efficiency is low in the honeycomb filter regenerating process, the pressure loss is quickly increased to cause necessity of frequent regenerating processes of the honeycomb filter.

When the collecting process and regenerating process of particulates are repeatedly carried out, the amount of ashes remaining in an even state over the almost entire face of the partition wall of the honeycomb filter quickly increases to cause clogging in the partition wall due to the ashes. In this case, since the initial pressure loss after the regenerating process of the honeycomb filter due to the residual ashes becomes high, it becomes necessary to frequently carry out washing processes for removing the ashes.

In the washing processes for removing the ashes, normally, the above-mentioned honeycomb filter needs to be detached from the exhaust gas purifying device provided in the exhaust gas passage in the internal combustion engine, and subjected to a washing process with water, a chemical treatment and the like; therefore, it is not possible to continuously use the conventional exhaust gas purifying device for a long time.

SUMMARY OF THE INVENTION

The present invention has been devised so as to solve the above-mentioned problems, and its object is to provide a honeycomb filter for purifying exhaust gases that can almost completely burn and remove particulates accumulated on the wall portion in a honeycomb filter regenerating process, and allows residual ashes on the wall portion to easily move inside the through hole after the regenerating process because the ashes can be easily separated from the wall portion, and an exhaust gas purifying device in which the honeycomb filter is less susceptible to a high initial pressure loss even after repetitive regenerating processes of the honeycomb filter, and can be continuously used for a long time.

A honeycomb filter for purifying exhaust gases, according to a first aspect of the present invention, has a structure in which: a columnar body made of porous ceramic comprises a number of through holes that are placed in parallel with one another in the length direction with wall portion interposed therebetween; and a part or all of the above-mentioned wall portion which separates the above-mentioned through holes functions as a filter for collecting particulates wherein a length l (mm) of the longest side in across section perpendicular to the above-mentioned length direction of the above-mentioned through hole and a length L (mm) in the length direction of the above-mentioned columnar body satisfy the following relationship: $60 \leq L/l \leq 500$, and a surface roughness Ra (according to JIS B 0601) of the inner wall of the above-mentioned through hole satisfies the following relationship: Ra≦100 μm.

A honeycomb filter for purifying exhaust gases, according to a second aspect of the present invention, has a structure in which: a columnar body made of porous ceramic comprises a number of through holes that are placed in parallel with one another in the length direction with wall portion interposed therebetween; and a part or all of the above-mentioned wall portion which separates the above-mentioned through holes functions as a filter for collecting particulates, wherein an area S (mm²) of the cross section perpendicular to the length direction of the above-mentioned through hole and the length L (mm) in the length direction of the above-mentioned columnar body satisfy the following relationship: 20≦L/S≦400, and a surface roughness Ra (according to JIS B 0601) of the inner wall of the through hole satisfies the following relationship: Ra≦100 μm.

Moreover, an exhaust gas purifying device according to the present invention comprises: a casing connected to an exhaust gas passage of an internal combustion engine; and the honeycomb filter for purifying exhaust gases according to the present invention and heating means, which are equipped inside the above-mentioned casing, wherein upon carrying out a regenerating process for the honeycomb filter for purifying exhaust gases, gases heated by the heating means are flown into the honeycomb filter for purifying exhaust gases under conditions that a flow-in rate is 0.3 m/sec or more and an oxygen concentration is 6% or more.

Figure 1:
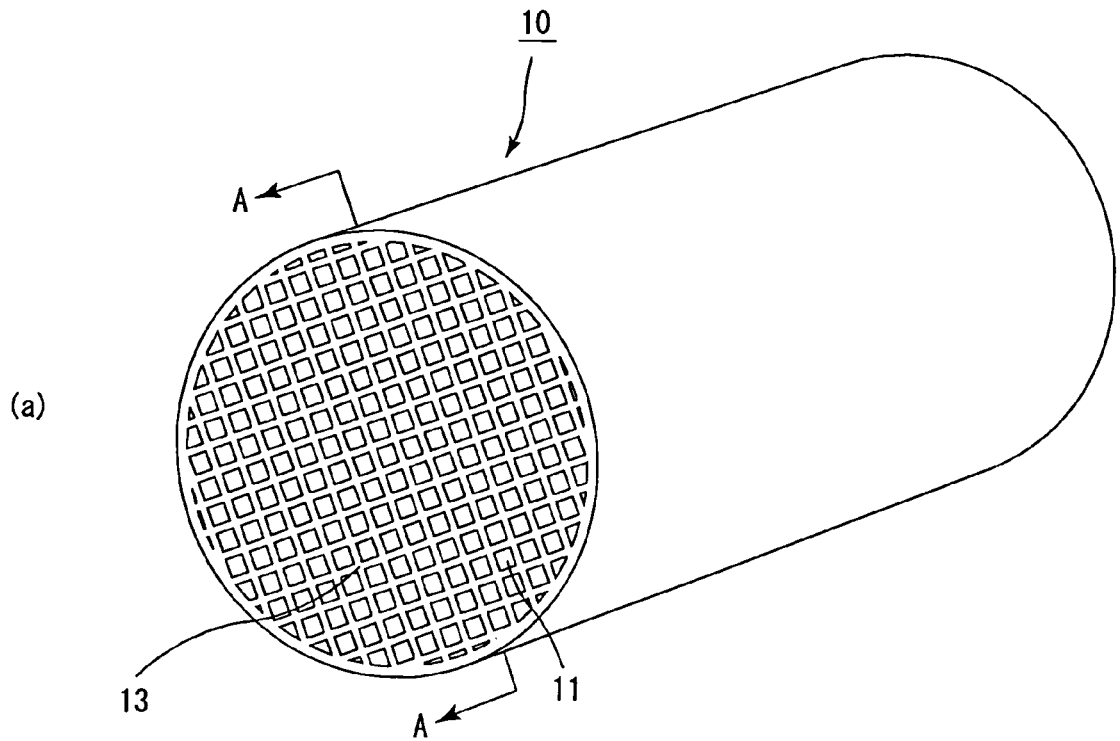
FIG. 1(a) is a perspective view that schematically shows one example of a honeycomb filter for purifying exhaust gases of the present invention.
FIG. 1(b) is a cross-sectional view taken along line A-A of FIG. 1(a).
Figure 1:
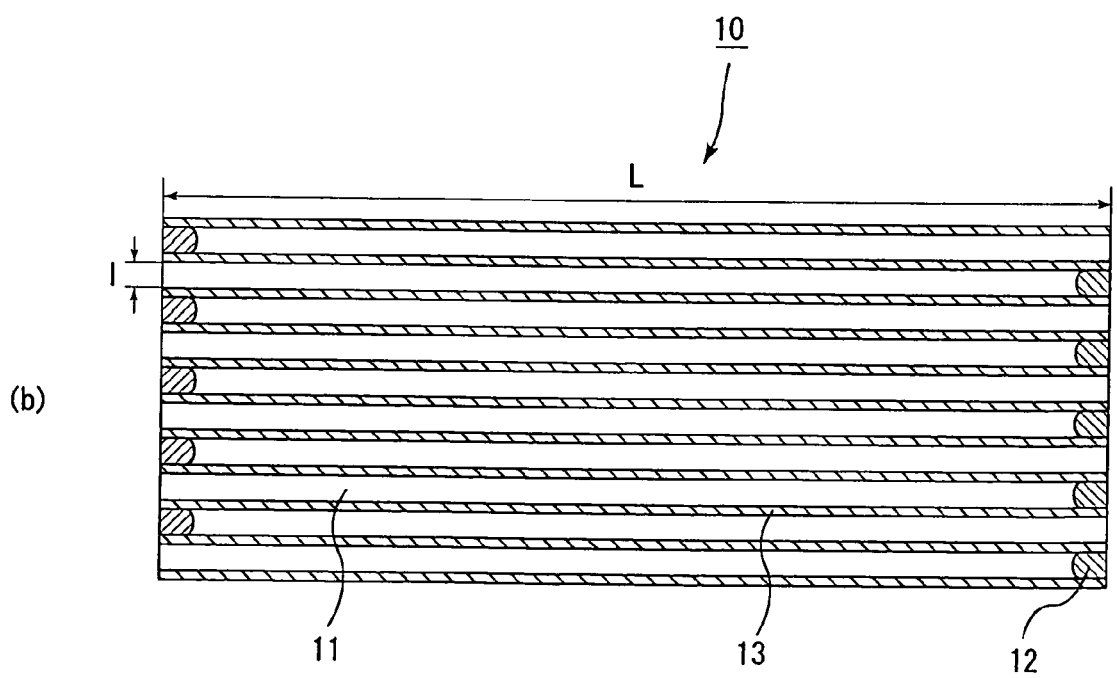

| EXPLANATION OF SYMBOLS | |
|---|---|
| 10, 20 | honeycomb filter for purifying exhaust gases |
| 11, 31 | through hole |
| 12, 32 | plug |
| 13 | wall portion |
| 24 | adhesive layer |
| 25 | ceramic block |
| 26 | sealing material layer |
| 30 | porous ceramic member |
| 33 | partition wall |

DETAILED DISCLOSURE OF THE INVENTION

Referring to the drawings, the following description will explain honeycomb filters for purifying exhaust gases according to the first and second aspects of the present invention and an exhaust gas purifying device of the present invention.

First, the honeycomb filters for purifying exhaust gases according to the first and second aspects of the present invention will be described.

The honeycomb filter for purifying exhaust gases according to the first aspect of the present invention has a structure in which:

a columnar body made of porous ceramic comprises a number of through holes that are placed in parallel with one another in the length direction with wall portion interposed therebetween; and a part or all of the above-mentioned wall portion which separates the above-mentioned through holes functions as a filter for collecting particulates wherein a length l (mm) of the longest side in a cross section perpendicular to the above-mentioned length direction of the above-mentioned through hole and a length L (mm) in the length direction of the above-mentioned columnar body satisfy the following relationship: 60≦L/l≦500, and a surface roughness Ra (according to JIS B 0601) of the inner wall of the above-mentioned through hole satisfies the following relationship: Ra≦100 μm.

The honeycomb filter for purifying exhaust gases according to the second aspect of the present invention has a structure in which:

a columnar body made of porous ceramic comprises a number of through holes that are placed in parallel with one another in the length direction with wall portion interposed therebetween; and a part or all of the above-mentioned wall portion which separates the above-mentioned through holes functions as a filter for collecting particulates, wherein an area S (mm²) of the cross section perpendicular to the length direction of the above-mentioned through hole and the length L (mm) in the length direction of the above-mentioned columnar body satisfy the following relationship: $20 \leq L/S \leq 400$, and a surface roughness Ra (according to JIS B 0601) of the inner wall of the through hole satisfies the following relationship: $Ra \leq 100$ μm.

In other words, the honeycomb filter for purifying exhaust gases according to the second aspect of the present invention has the same structure as that of the honeycomb filter for purifying exhaust gases according to the first aspect of the present invention except that, instead of satisfying the relational expression $60 \leq L/l \leq 500$, it satisfies the relational expression $20 \leq L/S \leq 400$. Depending on the shape of the cross section perpendicular to the length direction of the through hole, the honeycomb filter for purifying exhaust gases according to the first aspect of the present invention is identical to the honeycomb filter for purifying exhaust gases according to the second aspect of the present invention.

Therefore, the following description will simultaneously explain the honeycomb filter for purifying exhaust gases according to the first aspect of the present invention together with the honeycomb filter for purifying exhaust gases according to the second aspect of the present invention as the honeycomb filter for purifying exhaust gases of the present invention, with different portions being respectively explained.

FIG. 1(a) is a perspective view that schematically shows one example of a honeycomb filter for purifying exhaust gases according to the present invention (hereinafter, simply referred to as honeycomb filter of the present invention), and FIG. 1(b) is a cross-sectional view taken along line A-A of the honeycomb filter shown in FIG. 1(a).

As shown in FIG. 1(a), a honeycomb filter for purifying exhaust gases 10 of the present invention has a structure in that a columnar body made of porous ceramic comprises a number of through holes 11 that are placed in parallel with one another in the length direction with wall portion 13 interposed therebetween; and a part or all of the above-mentioned wall portion 13 which separates the above-mentioned through holes functions as a filter for collecting particulates.

In other words, as shown in FIG. 1(b), each of the through holes 11 formed in the porous ceramic member 10 has either of its ends on the inlet side and outlet side of exhaust gases sealed with a plug 12; thus, exhaust gases that have entered one of the through holes 11 are designed to flow out of another through hole 11 after always passing through the wall portion 13 that separates the corresponding through holes 11.

Consequently, particulates contained in the exhaust gases that have entered the honeycomb filter 10 are captured by the wall portion 13 when passing through the wall portion 13 so that the exhaust gases are purified.

The honeycomb filter 10 of the present invention is designed so that a length l (mm) of the longest side in a cross section perpendicular to the length direction of the through hole 11 and a length L (mm) in the length direction of the honeycomb filter 10 (columnar body) satisfy the following relationship: $60 \leq L/l \leq 500$, or is alternatively designed so that an area S (mm$^2$) of the cross section perpendicular to the length direction of the through hole 11 and the length L (mm) in the length direction of the honeycomb filter 10 (columnar body) satisfy the following relationship: $20 \leq L/S \leq 400$.

In the honeycomb filter 10 of the present invention, all the through holes 11 preferably satisfy the relational expression, $60 \leq L/l \leq 500$, or the relational expression, $20 \leq L/S \leq 400$; however, in the case where the value of L/l or the value of L/S is different for each of the through holes, the average value thereof may satisfy the relational expression, $60 \leq L/l \leq 500$, or the relational expression, $20 \leq L/S \leq 400$.

In particular, the above-mentioned relationship is desirably satisfied on the exhaust gas inlet side.

By setting the above-mentioned value L/l or L/S in such a range in the regenerating process of the honeycomb filter 10, gases heated to high temperatures by a heating means (not shown) are flown to the end on the exhaust gas outlet side as a laminar flow inside the through hole 11; therefore, since the particulates deposited on the wall portion 13 are successively burned from the exhaust gas inlet side so that the particulates can be almost completely burned and removed.

When the above-mentioned L/l is less than 60, or when the above-mentioned L/S is less than 20, the length (l) of the longest side on the cross-section perpendicular to the length direction of the through hole 11 becomes too long, or the area (S) on the cross-section perpendicular to the length direction of the through hole 11 becomes too large, or the length (L) in the length direction of the honeycomb filter 10 becomes too short. In the case where the length (l) of the longest side on the cross-section perpendicular to the length direction of the through hole 11 becomes too long or when the area (S) on the cross-section perpendicular to the length direction of the through hole 11 becomes too large, the through hole 11 in the honeycomb filter 10 becomes large, failing to form gases flowing inside the through hole 11 into a laminar flow in the regenerating process of the honeycomb filter 10. Consequently, in the regenerating process of the honeycomb filter 10, it is not possible to successively burn the particulates deposited on the wall portion 13 from the exhaust gas inlet side; thus, ashes tend to remain in the way or particulates are not completely removed, resulting in degradation in the regenerating efficiency in the honeycomb filter and the subsequent necessity of frequent regenerating processes of the honeycomb filter 10. Moreover, in the case where the length (L) in the length direction of the honeycomb filter 10 becomes too short, since gases easily collide with the sealed portion (plug) on the other end of the honeycomb filter 10, a turbulent flow is generated in the through hole. Consequently, since the burning process is started not from the inlet portion of the honeycomb filter 10, but from all portions inside thereof simultaneously, the resulting ashes are evenly deposited in the through hole as a whole, and not allowed to move toward the exhaust gas outlet side. Here, since the length of the wall portion 13 in the length direction is of course shortened (that is, the filtering area becomes smaller), clogging occurs quickly due to the particulates, resulting in the necessity of frequent regenerating processes of the honeycomb filter 10 and the subsequent increase in the fuel costs.

In contrast, when the above-mentioned L/l exceeds 500, or when the above-mentioned L/S exceeds 400, the length (l) of the longest side on the cross-section perpendicular to the length direction of the through hole 11 becomes too short, or the area (S) on the cross-section perpendicular to the length direction of the through hole 11 becomes too small, or the length (L) in the length direction of the honeycomb filter 10 becomes too long. In the case where the length (l) of the longest side on the cross-section perpendicular to the length direction of the through hole 11 becomes too short, or when the area (S) on the cross-section perpendicular to the length direction of the through hole 11 becomes too small, it becomes difficult for the exhaust gases to flow through the through hole 11, failing to evenly collect particulates; consequently, the particulates are deposited on the portion on the exhaust gas inlet side of the honeycomb filter 10 to cause bridging. In such a case, presumably, in the regenerating process of the honeycomb filter 10, burning of particulates occurs only on the exhaust gas inlet side, making it impossible for the ashes to move toward the exhaust gas outlet side, as well as causing cracks due to a thermal stress imposed on the honeycomb filter 10.

Moreover, in the case where the length (L) in the length direction of the honeycomb filter 10 becomes too long, in the regenerating process of the honeycomb filter 10, since it is difficult for exhaust gases to flow through the through hole 11, it becomes difficult to evenly collect particulates; consequently, the particulates are deposited on the portion on the exhaust gas inlet side of the honeycomb filter 10 to cause bridging. Furthermore, it is not possible to heat the exhaust gas outlet side of the honeycomb filter 10 to a high temperature, failing to burn and remove the particulates deposited on the wall portion 13 in the vicinity of the exhaust gas outlet side. Consequently, in the regenerating process of the honeycomb filter 10, burning of the particulates occurs from the exhaust gas inlet side up to the center portion, resulting in cracks due to a thermal stress in the honeycomb filter 10.

Here, the above-mentioned L/l is desirably set in a range of $100 \leq L/l \leq 300$. This range makes it possible to burn and remove particulates deposited on the wall portion 13 more effectively.

Moreover, in the honeycomb filter 10 of the present invention, the surface roughness Ra of the inner walls of the through hole 11 is set to $Ra \leq 100$ μm. This arrangement allows residual ashes on the wall portion 13 to be easily separated from the wall portion 13 through the above-mentioned regenerating process. Therefore, in the above-mentioned regenerating process, it becomes possible to easily move ashes deposited on the wall portion 13 by using high-temperature gases that are flown as a laminar flow, and consequently to prevent ashes from remaining on the entire surface of the wall portion 13 in an even state.

As described above, one of the conventional problems is that it is difficult to separate the residual ashes on the wall portion, and the reason for this has not been clarified; however, it is found through studies by the present inventors that by setting the surface roughness Ra of the inner walls of the through hole to $Ra \leq 100$ μm, the residual ashes on the wall portion can be easily separated.

In the case of the surface roughness Ra of the inner walls of the through hole 11 exceeding 100 μm, it becomes difficult to separate the ashes deposited on the wall portion 13 from the wall portion 13 after the regenerating process of the honeycomb filter 10; thus, the above-mentioned regenerating process fails to move the ashes toward the exhaust gas outlet side of the through hole 11 by using high-temperature gases entered the inside of the through hole 11. For this reason, the above-mentioned ashes are present over the entire wall portion 13; thus, when the regenerating process of the honeycomb filter 10 is carried out repeatedly, the initial pressure loss of the honeycomb filter 10 becomes higher quickly, making it impossible to continuously use the filter for a long time.

The upper limit of the surface roughness Ra of the inner walls of the through hole 11 is desirably set to 50 μm, more desirably to 10 μm. Thus, in the regenerating process of the honeycomb filter 10, it becomes possible to separate the ashes deposited on the through hole 11 from the wall portion 13 more effectively by using the gases as a laminar flow that is flown into the through hole 11, and consequently to move the ashes through the through hole 11.

The lower limit of the surface roughness Ra of the inner walls of the through hole 11 is desirably set to 1.0 μm. When the surface roughness Ra of the inner walls of the through hole 11 is less than 1.0 μm, particulates are deposited to fill the gaps among particles of a porous ceramic material that forms the inner walls of the through hole 11; thus, clogging tends to occur in the inner walls of the through hole 11. Consequently, since ashes are easily accumulated among the particles after the regenerating process, it becomes difficult to separate the ashes. In addition, the particulates, which have been captured in a manner so as to fill the gaps among the particles that constitute the inner walls of the through hole 11, are aggregated and hardly allowed to react so that the regenerating process becomes difficult. When the surface roughness Ra of the inner walls of the through hole 11 is 1.0 μm or more, the exhaust gases are made to form various flows so that the particulates can be collected while preventing clogging in the inner walls of the through hole 11; thus, it becomes possible to prevent degradation in the reacting property in the regenerating process. Moreover, by allowing the exhaust gases to form various kinds of flows, the exhaust gases are made to flow in and out more vigorously so that it becomes possible to separate the ashes from the inner walls of the through hole 11 more easily.

The honeycomb filter 10 of the present invention is made from a porous ceramic material. With respect to the ceramic material, not particularly limited, examples thereof include: oxide ceramics such as cordierite, alumina, silica, mullite and the like; carbide ceramics such as silicon carbide, zirconium carbide, titanium carbide, tantalum carbide, tungsten carbide and the like; and nitride ceramics such as aluminum nitride, silicon nitride, boron nitride, titanium nitride and the like. Normally, oxide ceramics such as cordierite and the like are utilized. These materials make it possible to carry out the manufacturing process at low costs, have a comparatively small coefficient of thermal expansion and are less susceptible to oxidation during use. Further, silicon-containing ceramics made by blending metallic silicon in the above-mentioned ceramics, and ceramics bonded by silicon and silicate compound may be used.

Moreover, although not particularly limited, the porosity of the honeycomb filter 10 of the present invention is desirably set in a range from 40 to 80%. When the porosity is less than 40%, the honeycomb filter 10 is more susceptible to clogging, while the porosity exceeding 80% causes degradation in the strength of the honeycomb filter 10; thus, it might be easily broken.

Here, the above-mentioned porosity can be measured through known methods, such as a mercury press-in method, Archimedes method, a measuring method using a scanning electronic microscope (SEM), and the like.

The average pore diameter of the honeycomb filter 10 is desirably set in a range from 5 to 100 μm. The average pore diameter of less than 5 μm tends to cause clogging of particulates easily. In contrast, the average pore diameter exceeding 100 μm tends to cause particulates to pass through the pores; thus, the particulates cannot be collected, making the members unable to function as a filter.

Moreover, as shown in FIG. 1(b), in the honeycomb filter 10, a number of through holes 11 used for allowing exhaust gases to flow are placed in paralleled with one another in the length direction with wall portion 13 interposed therebetween, and each of the through holes 11 has either of its ends on the inlet side and outlet side sealed with a plug 12.

With respect to the material to be used for forming the plug 12, not particularly limited, for example, the above-mentioned ceramic material is proposed. In particular, the same material as the ceramic material forming the honeycomb filter 10 is desirably used. Thus, it becomes possible to provide the same coefficient of thermal expansion, and consequently to prevent generation of cracks due to temperature changes during use and upon regenerating processes.

With respect to the size of the honeycomb filter 10, not particularly limited, it is appropriately determined by taking the size of an exhaust gas passage of the internal combustion engine to be used and the like into consideration.

Moreover, with respect to the shape thereof, not particularly limited as long as it is a column shape, for example, any desired shape such as a cylinder shape, an elliptical column shape, a rectangular column shape and the like may be used. In general, as shown in FIG. 1, those having a cylinder shape are often used.

Moreover, in the honeycomb filter of the present invention, a columnar body is desirably formed by combining a plurality of rectangular columnar porous ceramic members through adhesive layer, each of the above-mentioned columnar porous ceramic member comprising a number of through holes that are placed in parallel with one another in the length direction with partition wall interposed therebetween. With this arrangement, since the columnar body is divided into a plurality of the porous ceramic members, it is possible to reduce a thermal stress exerted on the porous ceramic members during use, and consequently to make the honeycomb filter of the present invention superior in heat resistance. Moreover, by increasing or reducing the number of porous ceramic members, it is possible to freely adjust the size thereof.

Figure 2:
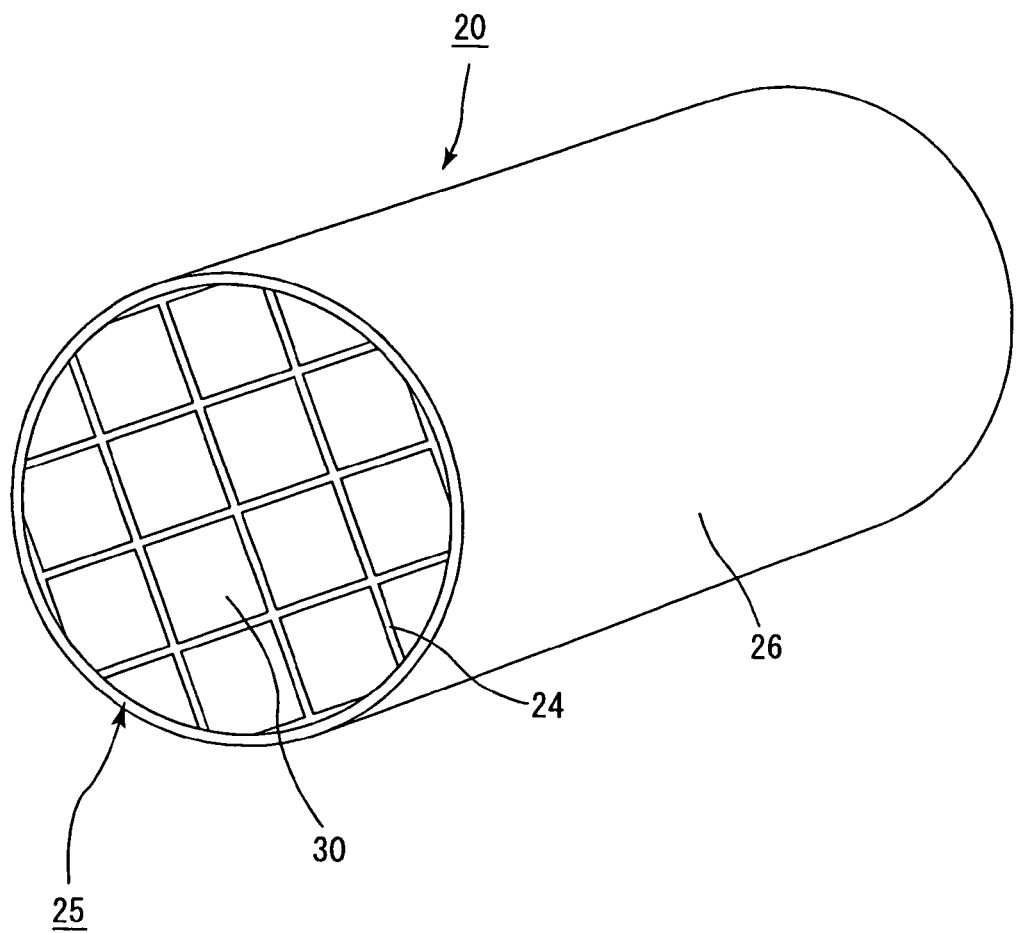
FIG. 2 is a perspective view that schematically shows another example of the honeycomb filter of the present invention.

FIG. 2 is a perspective view that schematically shows another example of the honeycomb filter of the present invention, FIG. 3(a) is a perspective view that schematically shows one example of porous ceramic members that constitute the honeycomb filter shown in FIG. 2, and FIG. 3(b) is a cross-sectional view taken along line B-B of FIG. 3(a).

Figure 3:
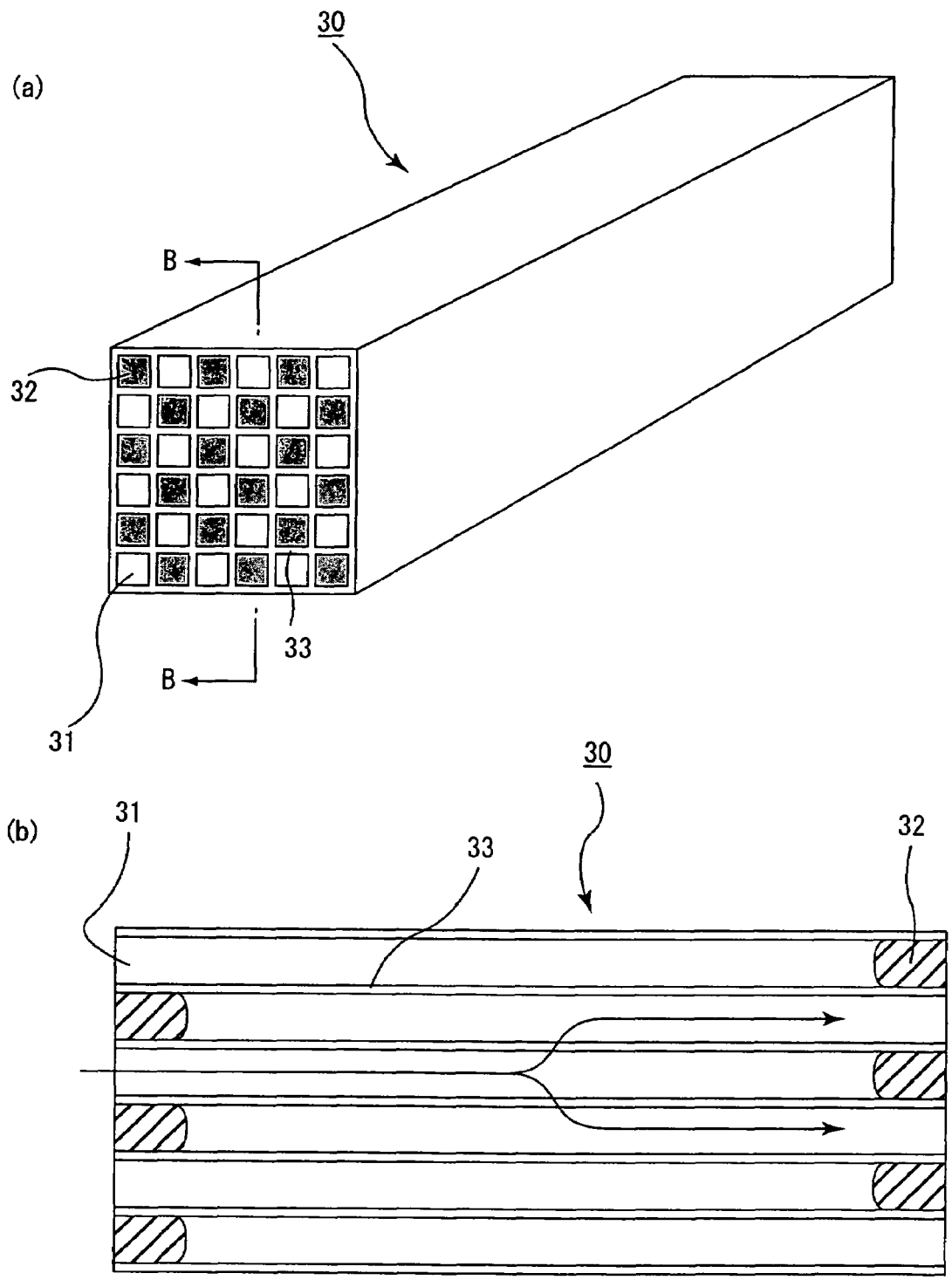
FIG. 3(a) is a perspective view that schematically shows a porous ceramic member used in the honeycomb filter of the present invention shown in FIG. 2.
FIG. 3(b) is a cross-sectional view taken along line B-B of FIG. 3(a).

As shown in FIG. 2, in a honeycomb filter 20 of the present invention, a plurality of porous ceramic members 30 are combined with one another through adhesive layers 24 to form a ceramic block 25, and a sealing material layer 26 is formed on the circumference of the ceramic block 25. Moreover, as shown in FIG. 3, each of the porous ceramic members 30 has a structure in that a number of through holes 31 are placed in parallel with one another in the length direction so that partition wall 33 that separate the through holes 31 from each other are allowed to function as filters.

In other words, as shown in FIG. 3(b), each of the through holes 31 formed in the porous ceramic member 30 has either of its ends on the inlet side and outlet side of exhaust gases sealed with a plug 32; thus, exhaust gases that have entered one of the through holes 31 are flown out of another through hole 31 after having always passed through the wall portion 33 that separates the corresponding through holes 31.

Moreover, the sealing material layer 26 is placed so as to prevent exhaust gases from leaking through the circumference of each ceramic block 25 when the honeycomb filter 20 is provided in an exhaust passage of an internal combustion engine.

Here, in FIG. 3(b), arrows indicate flows of exhaust gases.

The honeycomb filter 20 having the above-mentioned structure is placed in the exhaust passage in an inner combustion engine so that particulates in the exhaust gases discharged from the internal combustion engine are captured by the partition wall 33 when passing through the honeycomb filter 20; thus, the exhaust gases are purified.

Since the honeycomb filter 20 of this type has superior heat resistance and provides easy regenerating processes and the like, it has been applied to various large-size vehicles and vehicles with diesel engines.

In the honeycomb filter 20 of the present invention having the above-mentioned structure, the length of the longest side of the throughhole 31 of the porous ceramic member 30 corresponds to 1 in the above-mentioned honeycomb filter 10, the area of the through hole 31 of the porous ceramic member 30 corresponds to S in the above-mentioned honeycomb filter 10, and the length in the length direction of the porous ceramic member 30 corresponds to L in the above-mentioned honeycomb filter 10. In the honeycomb filter 20 of the present invention also, the above-mentioned 1 and L satisfy the following relationship: $60 \leq L/l \leq 500$, or the above-mentioned S and L satisfy the following relationship: $20 \leq L/S \leq 400$, and the surface roughness Ra (according to JIS B 0601) of the inner wall of the through hole 31 satisfies the following relationship: $Ra \leq 100$ μm.

With respect to the material for the porous ceramic member 30, not particularly limited, the same materials as the above-mentioned ceramic materials may be used. In particular, silicon carbide, which has great heat resistance, superior mechanical properties and great thermal conductivity, is desirably used.

With respect to the porosity and average pore diameter of the porous ceramic member 30, the same porosity and average pore diameter as those of the honeycomb filter 10 of the present invention explained by using FIG. 1 may be used.

With respect to the particle size of ceramic particles to be used upon manufacturing the porous ceramic members 30, although not particularly limited, those which are less susceptible to shrinkage in the succeeding sintering process are desirably used, and for example, those particles, prepared by combining 100 parts by weight of particles having an average particle size from 0.3 to 50 μm with 5 to 65 parts by weight of particles having an average particle size from 0.1 to 1.0 μm, are desirably used. By mixing ceramic powders having the above-mentioned respective particle sizes at the above-mentioned blending ratio, it is possible to provide a porous ceramic member 30.

With respect to the material forming the adhesive layer 24, not particularly limited, for example, a material composed of an inorganic binder, an organic binder, inorganic fibers and inorganic particles may be used.

With respect to the inorganic binder, for example, silica sol, alumina sol and the like may be used. Each of these may be used alone or two or more kinds of these may be used in combination. Among the inorganic binders, silica sol is more desirably used.

With respect to the organic binder, examples thereof include polyvinyl alcohol, methyl cellulose, ethyl cellulose, carboxymethyl cellulose and the like. Each of these may be used alone or two or more kinds of these may be used in combination. Among the organic binders, carboxymethyl cellulose is more desirably used.

With respect to the inorganic fibers, examples thereof include ceramic fibers such as silica-alumina, mullite, alumina, silica and the like. Each of these may be used alone or two or more kinds of these may be used in combination. Among the inorganic fibers, silica-alumina fibers are more desirably used.

With respect to the inorganic particles, examples thereof include carbides, nitrides and the like, and specific examples thereof include inorganic powder or whiskers made of silicon carbide, silicon nitride, boron nitride and the like. Each of these may be used alone, or two or more kinds of these may be used in combination. Among the inorganic fine particles, silicon carbide having superior thermal conductivity is desirably used.

In the honeycomb filter 20 shown in FIG. 2, the ceramic block 25 is formed into a cylinder shape; however, not limited to the cylinder shape, the ceramic block of the honeycomb filter of the present invention may have any desired shape such as an elliptical column shape, a rectangular column shape and the like.

Moreover, the sealing material layer 26 is formed on the circumference of the ceramic block 25 so as to prevent exhaust gases from leaking through the circumference of each ceramic block 25. With respect to the material of the sealing material layer 26, not particularly limited, for example, the same material as the above-mentioned adhesive layer 24 may be used.

Not particularly limited, the thickness of the sealing material layer is desirably set in a range of 0.3 to 1.0 mm. The thickness of less than 0.3 mm tends to cause leak of exhaust gases from the circumference of the ceramic block 25, and, in contrast, the thickness exceeding 1.0 mm tends to cause degradation in economical efficiency, although it can sufficiently prevent leak of exhaust gases.

Moreover, the honeycomb filter of the present invention may have a catalyst capable of purifying CO, HC, NOx and the like in the exhaust gases.

When such a catalyst is supported thereon, the honeycomb filter of the present invention is allowed to function as a filter capable of collecting particulates in exhaust gases, and also to function as a catalyst supporting member for purifying CO, HC, NOx and the like contained in exhaust gases.

Furthermore, in the honeycomb filter of the present invention, by coating the inner walls of the through hole with a catalyst, it is possible to make ashes easily peeled off. Normally, compounds such as sulfides and phosphites contained in exhaust gases from fuel or the like react with the catalyst coat layer and the filter to form ashes and adhere thereto. However, it is assumed that the adhesion of metal such as the catalyst makes it possible to prevent the ashes from reacting with the catalyst coat layer and the filter.

With respect to the catalyst, not particularly limited as long as it can purify CO, HC, NOx and the like in exhaust gases, examples thereof include noble metals such as platinum, palladium, rhodium and the like. In addition to the noble metals, an element such as an alkali metal (Group 1 in Element Periodic Table), an alkali earth metal (Group 2 in Element Periodic Table), a rare-earth element (Group 3 in Element Periodic Table), or a transition metal element, may be added thereto.

Moreover, upon applying the catalyst onto the honeycomb filter of the present invention, it is preferable to apply the catalyst, after the surface thereof has been preliminarily coated with a support member such as alumina or the like. This arrangement makes it possible to increase the specific surface area, to increase the degree of dispersion of the catalyst, and consequently to increase the reactive portion of the catalyst. Moreover, since the support member prevents sintering of the catalyst metal, the heat resistance of the catalyst can be improved. In addition, the pressure loss is also lowered.

The honeycomb filter of the present invention in which the above-mentioned catalyst is supported is allowed to function as a gas purifying device in the same manner as the conventionally known DPFs with catalyst (Diesel Particulate Filter). Therefore, in the following description, the detailed description of the case where the honeycomb filter of the present invention also serves as a catalyst supporting member is omitted.

As described above, in the honeycomb filter of the present invention, with respect to a cross section perpendicular to the length direction of the through hole, the length l (mm) of the longest side and the length L (mm) in the length direction of the honeycomb filter (columnar body) satisfy the following relationship: $60 \leq L/l \leq 500$, or the area S (mm$^2$) of the cross section perpendicular to the length direction of the through hole and the length L (mm) in the length direction of the honeycomb filter (columnar body) satisfy the following relationship: $20 \leq L/S \leq 400$, and the surface roughness Ra (according to JIS B 0601) of the inner wall of the through hole is set to 100 μm or less.

Therefore, in the honeycomb filter of the present invention, during the regenerating process, gases heated to high temperatures by a heating means are flown through the inside of the through hole as a laminar flow; therefore, since the particulates deposited on the inner walls of the through hole are successively burned from the exhaust gas inlet side so that the particulates can be almost completely burned and removed.

Moreover, in the honeycomb filter of the present invention, since the surface roughness Ra is set to 100 μm or less; thus, this arrangement allows residual ashes remaining on the wall portion after the regenerating process of the honeycomb filter to be easily separated from the wall portion. Therefore, in the above-mentioned regenerating process, it becomes possible to easily move the ashes inside the through hole by using high-temperature gases that are flown through the inside of the through hole as a laminar flow, and consequently to prevent ashes from remaining on the entire surface of the wall portion in an even state.

The following description will explain an exhaust gas purifying device of the present invention.

The exhaust gas purifying device comprises:

a casing connected to an exhaust gas passage of an internal combustion engine; and the honeycomb filter for purifying exhaust of the present invention and heating means; which are equipped inside the above-mentioned casing, wherein upon carrying out a regenerating process for the honeycomb filter for purifying exhaust gases, gases heated by the heating means are flown into the honeycomb filter for purifying exhaust gases under conditions that a flow-in rate is 0.3 m/sec or more and an oxygen concentration is 6% or more.

Figure 4:
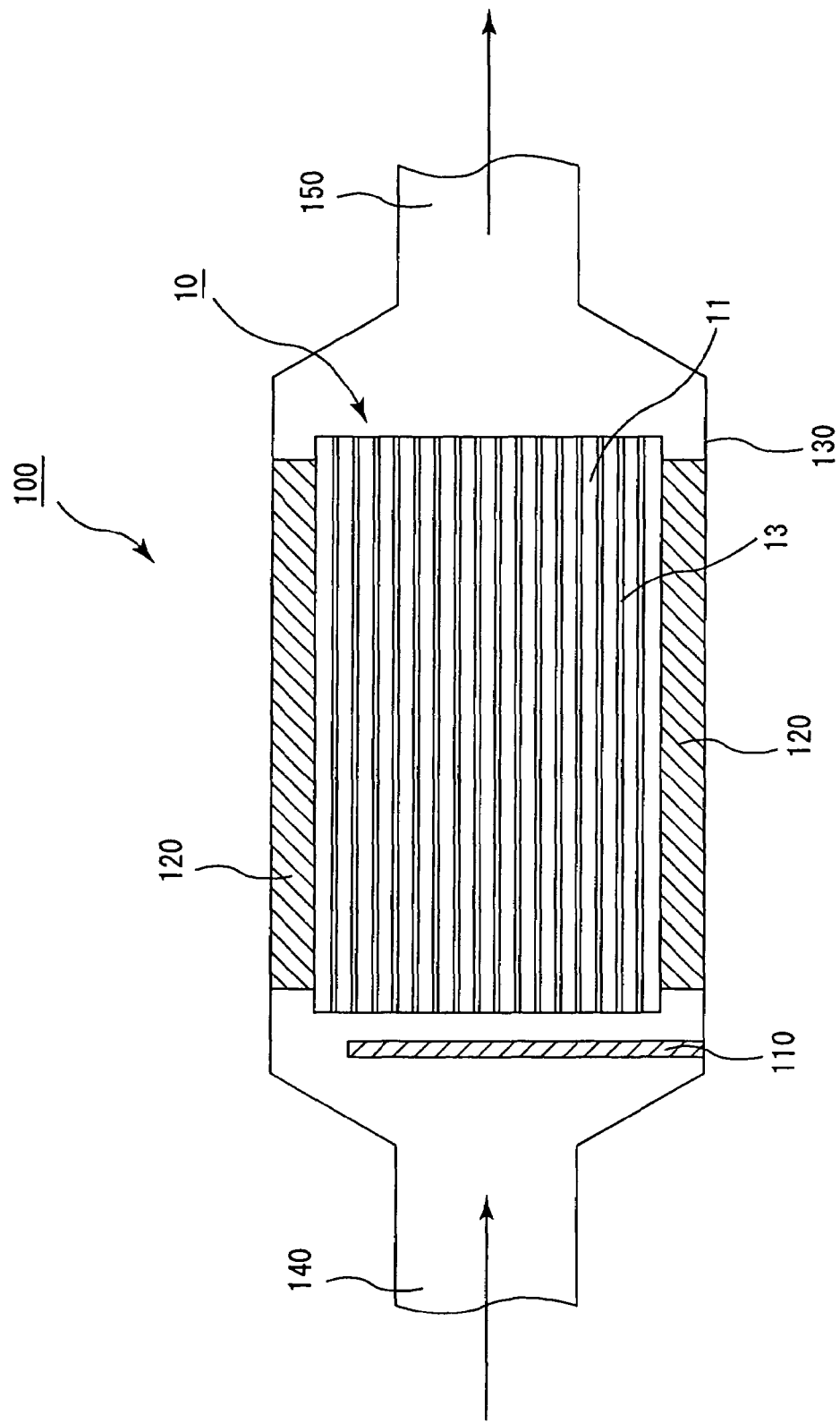
FIG. 4 is a cross-sectional view that schematically shows one example of an exhaust gas purifying device of the present invention.

FIG. 4 is a cross-sectional view that schematically shows one example of an exhaust gas purifying device according to the present invention.

As shown in FIG. 4, the exhaust gas purifying device 100 of the present invention is mainly constituted by the above-mentioned honeycomb filter 20 of the present invention, a casing 130 that covers the circumference of the honeycomb filter 20, a holding sealing material 120 placed between the honeycomb filter 20 and the casing 130, and a heating means 110 provided on the exhaust gas inlet side of the honeycomb filter 20, and an introduction pipe 140, coupled to an internal combustion engine such an engine, is connected to one end on the side to which exhaust gases of the casing 130 are introduced, and a discharging pipe 150, coupled to the outside, is connected to the other end of the casing 130. Here, in FIG. 4, arrows indicate flows of the exhaust gases.

Here, in FIG. 4, the honeycomb filter 20 shown in FIG. 2 is used; however, the honeycomb filter to be used in the exhaust gas purifying device of the present invention may be prepared as the honeycomb filter 10 shown in FIG. 1.

In the exhaust gas purifying device 100 of the present invention having the above-mentioned arrangement, exhaust gases, discharged from an internal combustion engine such as an engine or the like, are introduced into the casing 130 through the introduction pipe 140, and allowed to pass through the partition wall 33 from the through hole 31 of the honeycomb filter 20 so that, after particulates therein have been collected through the partition wall 33, the resulting purified exhaust gases are discharged outside through the discharging pipe 150.

In the exhaust gas purifying device 100 that carries out the above-mentioned exhaust gas purifying operation, when a large amount of particulates have accumulated on the partition wall 33 of the honeycomb filter 20 to cause a high pressure loss, a regenerating process is carried out on the honeycomb filter 20.

In the above-mentioned regenerating process, exhaust gases, heated by the heating means 110, are flown into the through holes 31 of the honeycomb filter 20 so that the honeycomb filter 20 is heated and the particulates accumulated on the wall portion 13 are completely burned and removed.

With respect to the gases to be heated by the heating means 110, for example, exhaust gases discharged from an internal combustion engine such as an engine or the like and air are listed.

In the exhaust gas purifying device 100 of the present invention, upon carrying out the above-mentioned regenerating process, gases, heated by the heating means 110, are flown into the honeycomb filter 20 under conditions that a flow-in rate is 0.3 m/sec or more and an oxygen concentration is 6% or more.

As described above, the honeycomb filter 20 of the present invention makes it possible to almost completely burn and remove particulates accumulated on the partition wall 33 through its regenerating process, and allows residual ashes on the partition wall 33 to easily come off after the regenerating process. In the exhaust gas purifying device 100 using the honeycomb filter 20 of this type, since the high-temperature gases, heated by the heating means 110 under the above-mentioned conditions, are flown into the honeycomb filter 20 under the above-mentioned conditions so that residual ashes, deposited on the almost entire surface of the partition wall 33 of the honeycomb filter 20, are allowed to move toward the exhaust gas outlet side of the through hole 31, and accumulated on this portion.

As a result, hardly any ashes are present on portions of the partition wall 33 except for those portions on the exhaust gas outlet side so that it is possible to maintain the filtering area of the partition wall 33 as a wide area for a long time, and consequently to make the honeycomb filter 20 less susceptible to a high initial pressure loss even when the collecting process of particulates and the regenerating process in the honeycomb filter 20 are repeatedly carried out; thus, it becomes possible to use the honeycomb filter 20 continuously for a long time.

In order to allow the above-mentioned gases to flow into the honeycomb filter 20 under the conditions that a flow-in rate is 0.3 m/sec or more and an oxygen concentration is 6% or more, in the case where exhaust gases are used as the above-mentioned gases, for example, a device capable of adjusting the flow rate of the exhaust gases and the oxygen concentration is attached to the mid-portion of the introduction pipe 140 or the vicinity of the end face on the inlet side of exhaust gases of the casing 130 so that the exhaust gases, adjusted to the conditions that a flow-in rate is 0.3 m/sec or more and an oxygen concentration is 6% or more by the above-mentioned device, are flown into the honeycomb filter 20.

Moreover, in the case where air is used as the above-mentioned gas, for example, a pump or the like is attached to the mid-portion of the introduction pipe 140 or the vicinity of the end on the inlet side of exhaust gases of the casing 130 so that air, adjusted to the conditions that a flow-in rate is 0.3 m/sec or more and an oxygen concentration is 6% or more by the pump, is flown into the honeycomb filter 20.

The flow-in rate of the gas of less than 0.3 m/sec fails to move the residual ashes deposited on the partition wall 33 through the above-mentioned regenerating process to the exhaust gas outlet side of the through hole 31, and also fails to burn the particulates accumulated on the partition wall 33 on the exhaust gas outlet side in the above-mentioned regenerating process, resulting in an insufficient regenerating operation and the like. Moreover, the oxygen concentration in the gas of less than 6% causes a difficulty in burning the particulates accumulated on the partition wall 33.

The heating means 110, which is provided so as to heat the gas to be made to flow into the through hole 31 to burn and remove the particulates deposited on the partition wall 33 in the regenerating process of the honeycomb filter 20 as described above, and with respect to the heating means 110, not particularly limited, for example, a device such as an electric heater, a burner or the like may be used.

Moreover, as shown in FIG. 4, the exhaust gas purifying device of the present invention may have a system in which the honeycomb filter 20 is heated by the heating means 110 provided on the exhaust gas inlet side of the honeycomb filter 20, or a system in which an oxide catalyst is supported on the honeycomb filter, with hydrocarbon being flown into the honeycomb filter supporting the oxide catalyst, so that the honeycomb filter is heated, or a system in which an oxide catalyst is placed on the exhaust gas inlet side of the honeycomb filter so that, by allowing the oxide catalyst to generate heat by supplying hydrocarbon to the exhaust gas inlet side of the oxide catalyst, the honeycomb filter is heated.

Since the reaction between the oxide catalyst and hydrocarbon is a heat generating reaction, the honeycomb filter can be regenerated in parallel with the exhaust gas purifying process, by utilizing a large amount of heat generated during the reaction. Here, even in this case, the gases to be flown into the honeycomb filter need to satisfy the conditions of a flow-in rate of 0.3 m/sec or more and an oxygen concentration of 6% or more.

With respect to the material for the holding sealing material 120, not particularly limited, examples thereof include inorganic fibers such as crystalline alumina fibers, alumina-silica fibers, silica fibers and the like, and fibers containing one or more kinds of these inorganic fibers and the like.

Moreover, the holding sealing material 120 desirably contains alumina and/or silica. This structure makes it possible to provide superior heat resistance and durability in the holding sealing material 120. In particular, the holding sealing material 120 desirably contains not less than 50% by weight of alumina. This structure makes it possible to provide improved elasticity even under high temperatures in a range from 900 to 950° C., and consequently to enhance the holding strength for the honeycomb filter 10.

Furthermore, desirably, the holding sealing material 120 is subjected to a needle punching process. This arrangement allows the fibers constituting the holding sealing material 120 to entangle with one another to improve elasticity and enhance the holding strength for the honeycomb filter 20.

Figure 5:
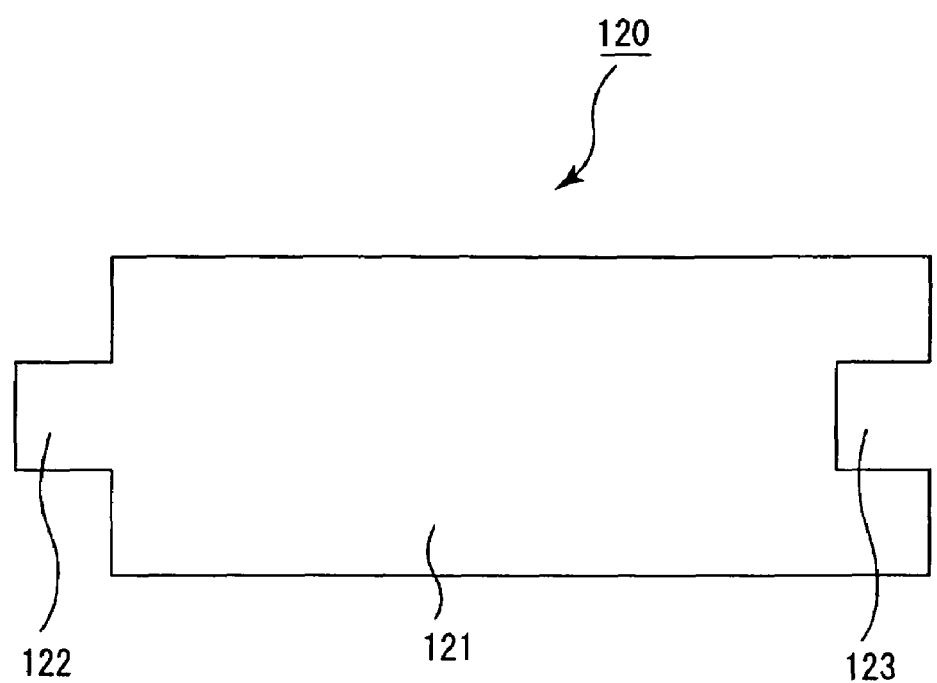
FIG. 5 is a plan view that schematically shows one example of a holding seal member used in the exhaust gas purifying device of the present invention.

With respect to the shape of the holding sealing material 120, not particularly limited as long as it can be applied onto the circumference of the honeycomb filter 20, any desired shape may be used; and a shape as shown in FIG. 5 is desirably used.

FIG. 5 is a plan view that schematically shows one example of the holding sealing material.

As shown in FIG. 5, the holding sealing material 120 is constituted by a base portion 121 having a rectangular shape in its plan view, a convex portion 122 that is formed on one of short sides of the base portion 121, and a concave portion 123 that is formed in the other short side of the base portion 121.

With respect to the size of the holding sealing material 120, not particularly limited, it is appropriately adjusted in accordance with the size of the honeycomb filter 20, and desirably, the length of the long side of the base portion 121 is set to the same as the length of the circumference of the honeycomb filter 20. This arrangement is made so as not to form a gap between the circumference of the honeycomb filter 20 and the holding sealing material 120 covering the circumference thereof.

Moreover, the length of the short side of the base portion 121 is desirably set to almost the same length as the entire length of the honeycomb filter 20. This arrangement allows the honeycomb filter 20 to have superior holding stability.

Furthermore, the sizes and positions of the convex portion 122 and the concave portion 123 are desirably arranged so that these are just fitted to each other, with the holding sealing material 120 being applied onto the circumference of the honeycomb filter 20.

By forming the holding sealing material 120 into the above-mentioned shape, the outer-diameter tolerance of the honeycomb filter 20 and the difference caused by winding processes of the holding sealing material 120 can be properly adjusted, and it is also possible to prevent deviations in the holding sealing material 120 placed on the circumference of the honeycomb filter 20.

Here, with respect to the shape of the holding sealing material in the exhaust gas purifying device in the present invention, not particularly limited to the shape of the holding sealing material 120 shown in FIG. 5, for example, any desired shape, such as a plate shape in the plan view and a shape in which a plurality of convex portions and a plurality of concave portions are formed on the two ends of the base portion having a rectangular shape in the plan view, may be used.

With respect to the material of the casing 130, not particularly limited, for example, stainless and the like may be used.

Figure 6:
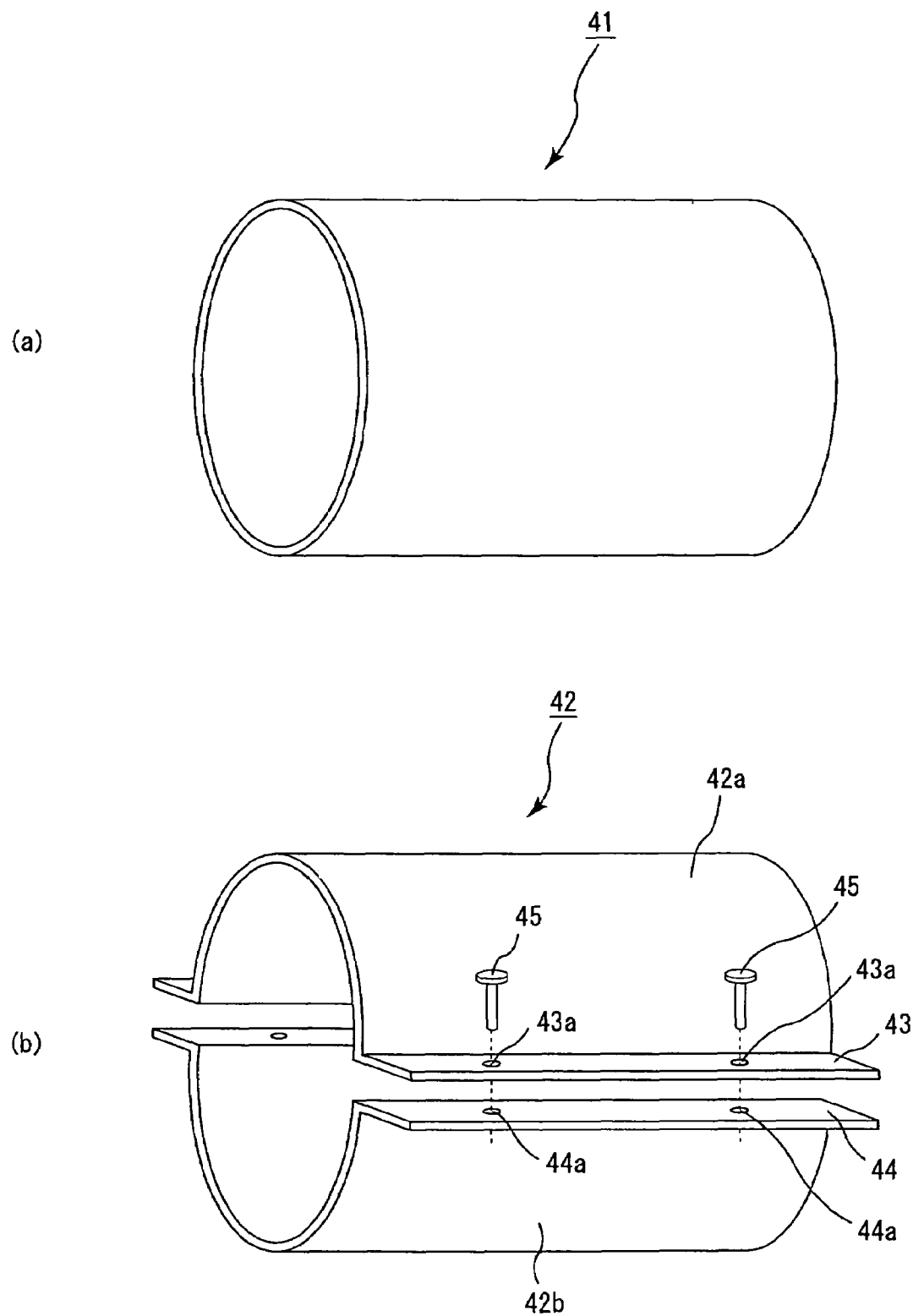
FIG. 6(a) is a perspective view that schematically shows one example of a casing used in the exhaust gas purifying device of the present invention.
FIG. 6(b) is a perspective view that schematically shows an example of another casing.

Moreover, with respect to the shape of the casing, not particularly limited, a cylinder shape as shown by a casing 41 of FIG. 6(a) may be used, or a two-division shell shape in which a cylinder is divided into two portions in its axis direction as shown by a casing 42 of FIG. 6(b) may be used.

The size of the casing 130 is appropriately adjusted so that the honeycomb filter 10 is placed therein through the holding sealing material 120. As shown in FIG. 4, the introduction pipe 140 used for introducing exhaust gases is connected to one of the end faces of the casing 130, and the discharging pipe 150 for discharging exhaust gases is connected to the other end face.

As described above, in the exhaust gas purifying device of the present invention, the honeycomb filter of the present invention is used, and during the regenerating process for the honeycomb filter, gases heated by the heating means are flown into the honeycomb filter for purifying exhaust gases under conditions of a flow-in rate of 0.3 m/sec or more and an oxygen concentration of 6% or more.

For this reason, when the regenerating process for the honeycomb filter is carried out by using the exhaust gas purifying device of the present invention, residual ashes deposited on the almost entire surface of the wall portion of the honeycomb filter are allowed to move toward the exhaust gas outlet side of the through hole, and accumulated on this portion.

As a result, hardly any ashes are present on portions of the wall portion except for those portions on the exhaust gas outlet side so that it is possible to maintain the filtering area of the wall portion as a wide area for a long time, and consequently to make the honeycomb filter less susceptible to a high initial pressure loss even when collecting and regenerating processes of particulates in the honeycomb filter are repeatedly carried out; thus, it becomes possible to use the honeycomb filter continuously for a long time.

Next, the following description will explain examples of a manufacturing method for the honeycomb filter of the present invention and a manufacturing method for the exhaust gas purifying device of the present invention.

First, the manufacturing method for the honeycomb filter of the present invention will be described.

In the case where the honeycomb filter of the present invention has a structure formed by a single sintered body as a whole, as shown in FIG. 1, first, an extrusion-molding process is carried out by using a material paste mainly composed of ceramics as described earlier so that a ceramic formed body, which has a shape corresponding to the honeycomb filter 10 as shown in FIG. 1, is formed.

In the above-mentioned extrusion-molding process, the material paste is continuously extruded through a metal die that is attached to the tip of the extrusion-molding machine and provided with a number of thin pores formed therein, and cut into a predetermined length so that the above-mentioned ceramic formed body is manufactured, and in order to manufacture the honeycomb filter of the present invention, the wall face of the thin pores formed in the die is subjected to a polishing process and the like so that the surface roughness Ra is adjusted to 100 μm or less.

The wall face of the thin pores of the above-mentioned die is a portion that directly contacts the material paste in the extrusion-molding process, and in the case where the wall face has a great surface roughness, the surface roughness of the inner wall of the opening that constitutes the through hole of a ceramic formed body to be manufactured becomes greater; thus, the surface roughness Ra of the inner wall of the through hole of the honeycomb filter of the present invention that is manufactured through post processes exceeds 100 μm.

Here, alternatively, the viscosity of the material paste and the particle sizes and blending ratios of the respective materials are properly adjusted so that the surface roughness Ra of the inner wall of the through hole of the honeycomb filter to be manufactured may be adjusted to 100 μm or less.

Moreover, the length (L' (mm)) in the length direction of the ceramic formed body is determined in accordance with the length (l' (mm)) of the longest side (inner diameter from which the wall is excluded) of the opening that constitutes the through hole of the ceramic formed body or the area (S' (mm$^2$)) of the opening, and, more specifically, L' is adjusted so that the above-mentioned L' and l' satisfy $60 \leq L'/l' \leq 500$, or so that the above-mentioned L' and S' satisfy $20 \leq L'/S' \leq 400$.

In this manner, by properly adjusting the length L' in the length direction of the ceramic formed body, the honeycomb filter according to the first aspect of the present invention in which the length (l (mm)) of the longest side (inner diameter from which the wall is excluded) of the cross section perpendicular to the length direction of the through hole and the length L (mm) in the length direction of the honeycomb filter (columnar body) satisfy the relationship, $60 \leq L/l \leq 500$, or the honeycomb filter according to the second aspect of the present invention in which the area (S (mm$^2$)) of the cross section perpendicular to the length direction of the through hole and the length L (mm) in the length direction of the honeycomb filter (columnar body) satisfy the relationship, $20 \leq L/S \leq 400$, can be manufactured.

Next, the above-mentioned ceramic formed body is subjected to degreasing and sintering processes under predetermined conditions so that a honeycomb filter, which is formed by porous ceramics and constituted by a single sintered body as a whole, is manufactured.

With respect to the composition of the material paste and conditions of the degreasing and sintering processes of the ceramic formed body and the like, the conventionally-used conditions that are applied to the honeycomb filter made from porous ceramics may be used.

Additionally, upon degreasing and sintering processes of the ceramic formed body, by adjusting the flow-in rate of gases to be flown through the through hole of the ceramic formed body, the surface roughness Ra of the inner wall of the through hole of the honeycomb filter of the present invention can be adjusted, and by increasing the flow-in rate of the gases, the surface roughness Ra of the inner wall of the through hole of the honeycomb filter of the present invention can be increased.

In the case where the honeycomb filter of the present invention supports a catalyst, it is preferable to carry out a sintering process for the ceramic formed body while carrying out a reducing process by using hydrogen gas. Presumably, this arrangement makes it possible to modify the surface of the ceramic sintered body, to change the wettability and consequently to allow the catalyst to be easily applied.

In the case where the honeycomb filter of the present invention supports a catalyst, it is preferable to immerse the ceramic sintered body into hydrofluoric acid. Presumably, this arrangement makes it possible to modify the nature of the ceramic, to change the wettability and consequently to allow the catalyst to be easily applied.

Next, in the case where a catalyst is supported on the honeycomb filter of the present invention, desirably, an alumina film is formed on the surface of the ceramic formed body that has been sintered and the catalyst is applied to the alumina film.

More specifically, by carrying out the following processes (A), (B) and (C) in this order, the alumina film, a promoter and a catalyst are applied thereto.

(A) Alumina Coating Method (A-1) Solution Impregnating Process

This solution-impregnating process is carried out so as to coat the alumina film by impregnating the surface of the ceramic formed body that has been subjected to the sintering process with a solution of a metal compound containing aluminum through a sol-gel method.

A metal inorganic compound and a metal organic compound may be used, with respect to the starting metal compound in the solution of the metal compound containing aluminum.

With respect to the metal inorganic compound, examples thereof include: $Al(NO_3)_3$, $AlCl_3$, $AlOCl$, $AlPO_4$, $Al_2(SO_4)_3$, $Al_2O_3$, $Al(OH)_3$ and Al. Among these, in particular, $Al(NO_3)_3$ and $AlCl_3$, which are easily dissolved in a solvent such as alcohol, water or the like, and handled easily, are desirably used.

With respect to the above-mentioned metal organic compound, examples thereof include: metallic alkoxide, metallic acetylacetonate and metallic carboxylate Al. Specific examples thereof include $Al(OCH_3)_3$, $Al(OC_2H_3)_3$ and $Al(iso-OC_3H_7)_3$.

With respect to the solvent for the metal compound solution containing aluminum, at least one or more materials, selected from the group consisting of water, alcohol, diol, polyhydric alcohol, ethylene glycol, ethylene oxide, triethanol amine and xylene by taking the solubility of the metal compound into consideration, are mixed and used therein.

Moreover, upon preparing the solution, hydrochloric acid, sulfuric acid, nitric acid, acetic acid, hydrofluoric acid or the like may be added as the solvent.

Here, $Al(NO_3)_3$ is proposed as a desirable example of the metal compound, and this is dissolved in a solvent at a comparatively low temperature so that the material solution is easily prepared. Here, with respect to the desired solvent, 1,3-butane diol is proposed. The first reason for using this material is because it has appropriate viscosity, and makes it possible to apply a gel film having an appropriate thickness in a gel state. The second reason for using this material is because the solvent forms metal alkoxide in the solution so that a metal oxide polymer made through bonds of oxygen-metal-oxygen, that is, a precursor of a metal oxide gel, is easily formed.

The amount of $Al(NO_3)_3$ is desirably set in a range from 10 to 50% by weight. The amount of less than 10% by weight fails to support the amount of alumina having a sufficient surface area capable of maintaining the activity of the catalyst for a long time; in contrast, the amount exceeding 50% by weight causes a great amount of heat generation during dissolution, making the solution easily to be gelled.

With respect to the temperature upon preparing the impregnating solution of the metal compound, it is desirably set in a range from 50 to 130° C. The temperature of less than 50° C. causes a low solubility in the solute, while the temperature exceeding 130° C. causes an abrupt progress of the reaction to form gel, making it impossible to use as the coating solution.

Upon preparing the impregnating solution of the metal compound, the stirring time is desirably set in a range from 1 to 9 hours. This range makes it possible to stabilize the viscosity of the solution.

In the solution impregnating process, desirably, the ceramic formed body that has been sintered is partially impregnated with the solution of the metal compound adjusted as described above so that the metal compound is fixed thereon, and for example, by allowing the sintered ceramic formed body to be impregnated to a target portion for supporting the catalyst, the supporting portion and the non-supporting portion are formed. Then, the sequence proceeds to the next drying process.

(A-2) Drying Process

In the drying process, volatile components such as $NO_2$ and the like are evaporated and removed so that the solution is subjected to the gelation to be fixed on the ceramic particle surface, with the excessive solution being simultaneously removed; thus, the heating process is carried out in a temperature range from 120 to 170° C. for about 2 hours. When the heating temperature is lower than 120° C., it becomes difficult to evaporate the volatile components, while, when the heating temperature is higher than 170° C., the thickness of the gelled film becomes uneven.

(A-3) Preliminary Sintering Process

This preliminary sintering process is a process for carrying out a preliminary sintering operation so as to remove residual components to form an amorphous alumina film, and it is preferable to heat the formed body at a temperature in a range from 300° C. to 500° C. When the temperature of the preliminary sintering is lower than 300° C., it becomes difficult to remove the residual organic substances; in contrast, when the temperature is higher than 500° C., $Al_2O_3$ is crystallized so that small-fiber protuberant boehmite can not be formed in the succeeding hydrothermal treatment.

(A-4) Hydrothermal Treatment

In a hydrothermal treatment, the preliminarily sintered ceramic formed body is immersed in hot water so as to form an alumina film made from small-fiber protuberant boehmite. When such a hydrothermal treatment is carried out, particles on the surface of the amorphous alumina film are subjected to a peptization action immediately after the treatment, and released into the solution in a sol state, and boehmite particles generated through hydration are formed into small-fiber protrusions and condensed so that a stable state against peptization is formed.

In other words, this hydrothermal treatment allows alumina particles individually adhering to the surface of each ceramic particle to form small fibers (needle-shaped particles) that stick out side by side to show a so-called hair transplantation structure, resulting in a roughened surface. Consequently, it becomes possible to form an alumina film having a high specific surface area.

The temperature of the above-mentioned hydrothermal treatment is desirably set in a range from 50 to 100° C. When the temperature is lower than 50° C., the hydration does not progress in the amorphous alumina film, failing to form the small-fiber protuberant boehmite. In contrast, when the temperature is higher than 100° C., water is evaporated, making it difficult to maintain the process for a long time. The treatment time is desirably set to 1 hour or more. The treatment time shorter than one hour makes the hydration of amorphous alumina insufficient.

(A-5) Main Sintering Process

In this process, the boehmite generated by the hydration is subjected to dehydrated to form alumina crystal. The main sintering process is desirably carried out at a temperature in a range from 500 to 1000° C. for 5 to 20 hours. When the temperature of the main sintering is lower than 500° C., crystallization does not progress sufficiently; in contrast, when the temperature thereof is higher than 1000° C., the crystallization progresses excessively, resulting in a reduction in the surface area.

Here, the processes of (A-3) and (A-4) may be omitted.

With respect to another supporting method for the support material, the following method may be proposed.

First, with respect to a preparation method for the solution, powder of the support material is finely crushed by using a mill or the like, and mixed with a solvent while being stirred to form a solution.

More specifically, powder of an oxide such as alumina, titania, zirconia or the like is formed by using a sol-gel method or the like. In this case, such a material having a specific surface area as high as possible is desirably used so as to form a coat layer of a catalyst; and the material having a high specific surface area value of 250 m²/g or more is desirably selected. Here, γ-alumina, which has a high specific surface area, is desirably selected. Moreover, in order to accelerate the decomposing reaction of sulfur, titania is also desirably added thereto.

To these powders, are added an inorganic binder, such as hydrated alumina, alumina sol, silica sol or the like, and about 5 to 20% by weight of a solvent such as pure water, water, alcohol, diol, polyhydric alcohol, ethylene glycol, ethylene oxide, triethanol amine, xylene or the like, and the resulting mixture is crushed and stirred. At this time, the crushing process is carried out until the size of the oxide to be used as the support material has reached a level of 500 nm or less. This finely crushing process makes it possible to form an alumina film on each particle evenly.

The sintered body is partially impregnated with a solution containing the above-mentioned powder of metal oxide as described earlier.

After having been dried through a heating process at 110 to 200° C. for about 2 hours, this is subjected to a main sintering process. The temperature of the main sintering process is desirably set to a temperature in a range from 500 to 1000° C., and the process is carried out for 1 to 20 hours. When the temperature of the main sintering process is lower than 500° C., crystallization does not progress sufficiently; in contrast, when the temperature exceeds 1000° C., the crystallization progresses excessively, resulting in a reduction in the surface area. Moreover, by measuring the weight before and after these processes, it is possible to calculate the support quantity.

(B) Method for Supporting Promoter and NOx Catalyst

(B-1) Solution Impregnating Process

This solution impregnating process is carried out so as to coat the surface of the sintered ceramic formed body with a film such as a rare-earth oxide film or the like, that is, a film containing alkali metal, alkali earth metal, a rare-earth element and a transition metal element, by impregnating the surface thereof with a solution of a metal compound containing a rare-earth element and the like through a sol-gel method.

With respect to the cerium-containing compound solution among the metal compound solutions containing a rare-earth element and the like, for example, $Ce(NO_3)_3$, $CeCl_3$, $Ce_2(SO_4)_3$, $CeO_2$, $Ce(OH)_3$ and $Ce_2(CO_3)_3$ may be used.

With respect to the solvent of the mixed solution, at least one or more materials, selected from the group consisting of water, alcohol, diol, polyhydric alcohol, ethylene glycol, ethylene oxide, triethanol amine and xylene by taking the solubility of the metal compound into consideration, are mixed and used therein.

Moreover, with respect to the catalyst used upon preparing the solution, hydrochloric acid, sulfuric acid, nitric acid, acetic acid, hydrofluoric acid or the like may be added.

Further, in order to improve the heat resistance of the alumina film, in addition to the rare-earth oxide, a single substance such as Li, K, Ca, Sr, Ba, La, Pr, Nd, Si, Zr and the like, and a compound thereof may be added to the starting material.

Here, $Ce(NO_3)_3$ is proposed as a desirable example of the metal compound, and this is dissolved in a solvent at a comparatively low temperature so that the material solution is easily prepared. Here, with respect to the desired solvent, ethylene glycol is proposed. The reason for the use of this material is because it has appropriate viscosity, and makes it possible to form a gel film having an appropriate thickness on the ceramic particle.

The amount of $Ce(NO_3)_3$ is desirably set in a range from 1 to 30% by weight. The amount of less than 1% by weight fails to promote soot oxidation; in contrast, the amount exceeding 30% by weight causes particle growth of $CeO_2$ after the sintering process.

The blending ratio between $Al(NO_3)_3$ and $Ce(NO_3)_3$ is desirably set to 10:2. The reason for this ratio is because the degree of dispersion of $CeO_2$ particles after the sintering process is improved by making $Al(NO_3)_3$ richer.

With respect to the temperature upon preparing the impregnating solution of the metal compound, it is desirably set in a range from 50 to 130° C. The temperature of less than 50° C. causes a low solubility in the solute, while the temperature exceeding 130° C. causes an abrupt progress of the reaction to form an uneven solution, making it impossible to use the solution.

Upon preparing the impregnating solution of the metal compound, the stirring time is desirably set in a range from 1 to 9 hours. This range makes it possible to stabilize the viscosity of the solution.

With respect to the cerium-containing metal compound $Ce(NO_3)_3$, in addition to the above-mentioned example, the following method may be preferably used to obtain the above-mentioned composite oxide: for example, $ZrO(NO_3)2$ and $ZrO_2$ are used as zirconium sources in order to prepare a composite oxide or a solid solution with zirconium, and by dissolving these materials in water and ethylene glycol to form a mixed solution, and after impregnating the sintered ceramic formed body with this mixed solution, the resultant is dried and sintered to form the cerium-containing metal compound thereon.

In the solution-impregnating process, desirably, the ceramic formed body that has been sintered is partially impregnated with the solution of the metal compound adjusted as described above so that the solution is fixed thereon, and for example, by allowing the sintered ceramic formed body to be impregnated to a target portion for supporting the catalyst, the supporting portion and the non-supporting portion are formed. Then, the sequence proceeds to the next drying process.

(B-2) Drying Process

In the drying process, volatile components such as $NO_2$ and the like are evaporated and removed so that the solution is dispersed to be fixed on the ceramic particle surface, with the excessive solution being simultaneously removed; thus, the heating process is carried out in a temperature range from 120 to 170° C. for about 2 hours. When the heating temperature is lower than 120° C., it becomes difficult to evaporate the volatile components, while, when the heating temperature is higher than 170° C., the dispersion is unevenly made.

(B-3) Sintering Process

This sintering process is a process for carrying out a sintering operation so as to remove residual components to deposit $CeO_2$ on the alumina film, and it is preferable to heat the formed body at a temperature in a range from 500° C. to 800° C. for 1 to 2 hours. When the temperature of the preliminary sintering is lower than 500° C., it becomes difficult to remove the residual organic substances; in contrast, when the temperature is higher than 800° C., particle growth tends to occur.

(C) Method for Supporting Catalyst (Active Component)

The surface of the sintered ceramic formed body is coated with, for example, an alumina film containing a rare-earth oxide, and an active component such as platinum or the like is supported on the alumina film. The amount of the active component supported thereon is determined in such a manner that the supporting body is immersed in the aqueous solution containing platinum and the like so as to absorb it by its water absorbing amount so that the surface thereof starts to slightly get wet.

Here, the water absorbing amount that is held by the sintered ceramic formed body is determined as follows: Supposing that the water-absorption measured value of a dried sintered ceramic formed body is 22.46% by weight and that the weight of the sintered ceramic formed body is 110 g and the capacity thereof is 0.163 l, this sintered ceramic formed body is allowed to absorb 24.7 g/l of water.

Here, with respect to the starting substance of platinum, for example, a nitric acid solution of dinitro diammine platinum ([Pt $(NH_3)2$ $(NO_2)2]HNO_3$), platinum concentration: 4.53% by weight) is used. For example, in order to deposit 1.7 g/l of platinum onto the entire sintered ceramic formed body, 1.7 (g/l)×0.163 (l)=0.272 g of platinum is deposited the sintered ceramic formed body; therefore, the nitric acid solution of dinitro diammine platinum (platinum concentration: 4.53% by weight) is diluted by distilled water. In other words, the weight ratiox(%) of the nitric acid solution of dinitro diammine platinum (platinum concentration: 4.53% by weight)/distilled water is calculated through the expression, X=0.272 (amount g of platinum)/24.7 (water content g)/4.53 (platinum concentration: % by weight), and found to be 24.8% by weight.

(C-1) Solution Impregnating Process

With respect to the aqueous solution of nitric acid solution of dinitro dianmine platinum prepared as described above, a desired amount to be deposited on the target sintered ceramic formed body is poured into a pallet.

Then, in the case of the above-mentioned conditions, the concentration is set to 24.8% by weight, and the solution is held in this state for a predetermined period of time until the solution has been entirely absorbed. Thus, platinum is dispersed and evenly fixed on the surface of the alumina supporting film that covers the sintered ceramic formed body.

(C-2) Drying and Sintering Processes

The sintered ceramic formed body that has been impregnated with the aqueous solution is dried through a heating process at 110° C. for about 2 hours so that, after moisture has been removed, this is subjected to a sintering process at about 500° C. for one hour in a nitrogen atmosphere so that platinum is formed into metal.

Here, in the present embodiment, with respect to the method for supporting the active component such as platinum or the like, a method for allowing platinum to be deposited through the water absorbing process is used; however, another method, such as an impregnating method in which the sintered ceramic formed body is fixed at a predetermined position in the solution to be impregnated for a predetermined period of time so as to be deposited up to the target position, an evaporation-to-dryness method, an equilibrium adsorption method, an incipient wetness method or a spraying method, may be used.

After the above-mentioned processes, the support material, promoter, NOx absorption-type catalyst and catalyst are supported on the surface of the sintered ceramic formed body.

In this case, with respect to the height of each of the materials (length along the exhaust gas flowing direction in the honeycomb filter), although not particularly limited, the heights of all the other materials are desirably adjusted to the height at which the catalyst is supported. When all the heights of the support member, promoter, NOx absorption-type catalyst and catalyst are made coincident with one another, the regenerating effects are improved because of synergistic effects, and when some of these are omitted at unnecessary portions, it becomes possible to reduce the pressure loss, and also to eliminate wasteful use of the materials to reduce costs.

Moreover, in the case where the honeycomb filter of the present invention has a structure in that, as shown in FIG. 2, a plurality of porous ceramic members are combined with one another through adhesive layers, first, an extrusion-molding process is carried out by using a material paste mainly composed of the above-mentioned ceramics so that a ceramic formed body, which has a shape corresponding to the porous ceramic member 30 as shown in FIG. 3, is formed.

Here, the extrusion-molding process is carried out under the same conditions as those in the extrusion-molding process of the honeycomb filter made of a single sintered body. However, the die to be used upon preparing the raw formed body is different from the die to be used upon forming the honeycomb filter made of a single sintered body in its shape and positions of the thin pores.

Next, the above-mentioned ceramic formed body is subjected to degreasing and sintering processes under predetermined conditions so that a porous ceramic member having a structure in that a plurality of through holes are placed in paralled with one another in the length direction with partition wall interposed therebetween is manufactured.

Additionally, upon degreasing and sintering processes of the ceramic formed body, by adjusting the flow-in rate of gases to be flown through the through hole of the formed body, the surface roughness Ra of the inner walls of the through hole of the honeycomb filter of the present invention can be adjusted, and by increasing the flow-in rate of the gases, the surface roughness Ra of the inner wall of the through hole of the honeycomb filter of the present invention can be increased.

In the case where the honeycomb filter of the present invention supports a catalyst, it is preferable to carry out a sintering process for the ceramic formed body while carrying out a reducing process by using hydrogen gas. Presumably, this arrangement makes it possible to modify the surface of the ceramic sintered body, to change the wettability and consequently to allow the catalyst to be easily applied.

In the case where the honeycomb filter of the present invention supports a catalyst, it is preferable to immerse the ceramic sintered body into hydrofluoric acid. Presumably, this arrangement makes it possible to modify the nature of the ceramic sintered body, to change the wettability and consequently to allow the catalyst to be easily applied.

Next, in the case where a catalyst is supported on the honeycomb filter of the present invention, desirably, an alumina film is formed on the surface of the ceramic formed body that has been sintered and the catalyst is applied to the alumina film, in the same manner as the above-mentioned manufacturing processes of the honeycomb filter made of a single sintered body.

Figure 7:
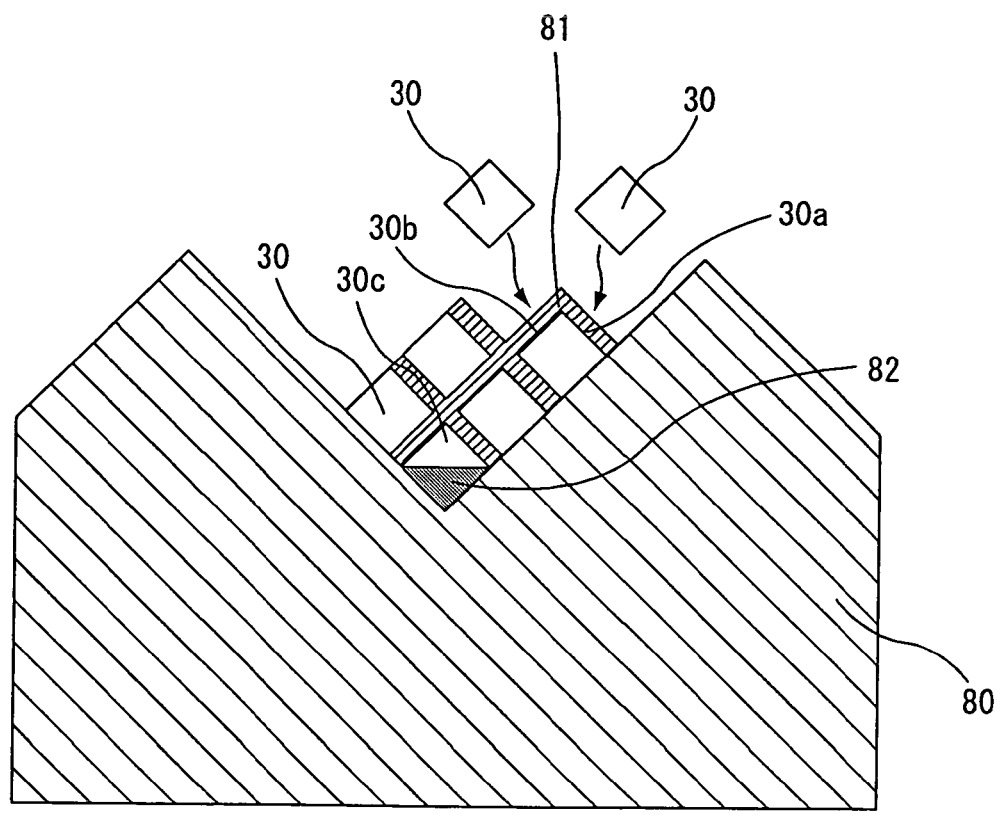
FIG. 7 is a cross-sectional view that schematically shows a state where the honeycomb filter shown in FIG. 3 is manufactured.

Next, as shown in FIG. 7, porous ceramic members 30 are placed on a base 80 the upper portion of which is designed to have a V-shape in its cross-section so as to allow the porous ceramic members 30 to be stacked thereon in a tilted manner, and adhesive paste to form an adhesive layer 24 is then applied onto two side faces 30a and 30b facing upward with an even thickness to form a bonding layer 81; thereafter, a laminating process for forming another porous ceramic member 30 on this bonding layer 81 is successively repeated so that a rectangular columnar ceramic laminated body 30 having a predetermined size is manufactured. At this time, with respect to the porous ceramic members 30 corresponding to four corners of the ceramic laminated body, a triangular columnar porous ceramic member 30c, which is formed by cutting a quadrangular columnar porous ceramic member into two, is bonded to a resin member 82 having the same shape as the triangular columnar porous ceramic member 30c by using a both-sides tape with easy peelability to prepare a corner member, and these corner members are used for the four corners of the ceramic laminated body, and after the lamination processes of the porous ceramic members 30, all the resin members 82 forming the four corners of the ceramic laminated body are removed; thus, a ceramic laminated body having a polygonal column-shape in its cross section may be formed. With this arrangement, it is possible to reduce the quantity of a waste corresponding to porous ceramic members to be disposed of, after the formation of the ceramic block by cutting the peripheral portion of the ceramic laminated body.

With respect to a method for manufacturing the ceramic laminated body having a polygonal column-shape in its cross section except for the method shown in FIG. 7, for example, a method in which the porous ceramic members to be located on four corners are omitted and a method in which porous ceramic members having a triangular shape are combined with one another may be used, in accordance with the shape of a honeycomb filter to be manufactured. Here, a quadrangular columnar ceramic member may of course be manufactured.

Next, the laminated body of this porous ceramic member 30 is heated so that the bonding layer 81 is dried and solidified to form an adhesive layer 24, and the peripheral portion of this is then cut into a shape as shown in FIG. 2 by using, for example, a diamond cutter so that a ceramic block 25 is manufactured.

Then, a sealing material layer 26 is formed on the circumference of the ceramic block 25 so that a honeycomb filter having a structure in that a plurality of porous ceramic members are combined with one another through adhesive layers is manufactured.

Here, with respect to the above-mentioned material paste, compositions of the adhesive and the sealing material paste, conditions for degreasing and sintering processes of the formed body, the same conditions and the like used upon manufacturing a conventional honeycomb filter having a structure in that a plurality of porous ceramic members are combined with one another through adhesive layers may be adopted.

Each of the honeycomb filters manufactured as described above has a column shape, and has a structure in that a number of through holes are arranged in paralled with one another with partition wall interposed therebetween.

In the case where the honeycomb filter has a structure formed by a single sintered body as a whole as shown in FIG. 1, the partition wall separating a number of through holes is allowed to function as particle-collecting filters as a whole; in contrast, in the case where the honeycomb filter has a structure in that a plurality of porous ceramic members are combined with one another through adhesive layers as shown in FIG. 2, since each of the wall portion separating the multiple through holes is constituted by a partition wall forming the porous ceramic member and an adhesive layer used for combining the porous ceramic members, one portion thereof, that is, the partition wall portion that is not made in contact with the adhesive layer of the porous ceramic member is allowed to function as the particle-collecting filter.

Next, the following description will explain a manufacturing method for the exhaust gas purifying device of the present invention.

Upon manufacturing the exhaust gas purifying device of the present invention, first, a holding sealing material with which the circumference of the honeycomb filter of the present invention is coated is prepared.

In order to form the holding sealing material, first, an inorganic mat-shaped matter (web) is formed by using inorganic fibers, such as crystalline alumina fibers, alumina-silica fibers, silica fibers and the like, and fibers and the like containing one or more kinds of these inorganic fibers.

Here, with respect to the method for forming the above-mentioned inorganic mat-shaped matter, not particularly limited, for example, a method in which the above-mentioned fibers and the like are dispersed in a solution containing an adhesive so that, by utilizing a paper machine and the like for forming paper, an inorganic mat-shaped matter is formed is proposed.

Moreover, the above-mentioned inorganic mat-shaped matter is desirably subjected to a needle punching process. This needle punching process allows the fibers to entangle with one another so that it is possible to prepare a holding sealing material that has high elasticity and is superior in holding the honeycomb filter.

Thereafter, the above-mentioned inorganic mat-shaped matter is subjected to a cutting process so that a holding sealing material having a shape, for example, shown in FIG. 5, is formed.

Next, the circumference of the honeycomb filter of the present invention is coated with the above-mentioned holding sealing material so that the holding sealing material is fixed thereon.

With respect to the means for fixing the above-mentioned holding sealing material, not particularly limited, for example, a means for bonding the holding sealing material by an adhesive or a means for tying it by using a string-shaped member may be used. Moreover, the sequence may proceed to the next process with the honeycomb filter being coated with the holding sealing material, without fixing it by using any specific means. Here, the above-mentioned string-shaped member may be made from a material to be decomposed through heat. Even if the string-shaped member is decomposed through heat after the honeycomb filter has been placed inside the casing, the holding sealing material is free from peeling since the honeycomb filter has already been placed inside the casing.

Next, the honeycomb filter that has been subjected to the above-mentioned processes is placed inside the casing.

Here, since the material, shape, structure and the like of the above-mentioned casing have been described earlier, the description thereof is omitted.

With respect to the method for installing the honeycomb filter in the casing, in the case where the casing is prepared as a cylinder-shaped casing 41 (FIG. 6(a)), for example, the following method is proposed: a honeycomb filter coated with the holding sealing material is pushed into one of its end faces, and after having been placed at a predetermined position, end faces to be connected to an introduction pipe, piping, a discharging pipe and the like are formed on the two ends of the casing 41. Here, the casing 41 may have a cylinder shape with a bottom face.

In this structure, in order to prevent the secured honeycomb filter from easily moving, factors, such as the thickness of the holding sealing material, the size of the honeycomb filter, the size of the honeycomb filter and the size of the casing 41, need to be adjusted to a degree in which the pushing process can be carried out with a considerably high pressing force being applied.

Moreover, in the case where the casing is prepared as a two-division shell-shaped casing 42 (FIG. 6(b)), for example, the following method is proposed: after a honeycomb filter has been placed at a predetermined position inside a semi-cylinder-shaped lower shell 42b, a semi-cylinder-shaped upper shell 42a is placed on the lower shell 42b so that through holes 43a formed in an upper fixing portion 53 and through holes 44a formed in a lower fixing portion 44 are made coincident with each other. Further, a bolt 45 is inserted through each of the through holes 43a and 44a and fastened with a nut or the like so that the upper shell 42a and the lower shell 42b are secured to each other. Then, end faces that have openings to be connected to an introduction pipe, piping, a discharging pipe and the like are formed on two ends of the casing 42. In this case also, in order to prevent the secured honeycomb filter from moving, the factors, such as the thickness of the holding sealing material, the size of the honey-comb filter, the size of the honeycomb filter and the size of the casing 42, need to be adjusted.

This two-division shell-shaped casing 42 makes it possible to carry out exchanging processes for the honeycomb filter placed inside thereof more easily in comparison with the cylinder-shaped casing 41.

Next, a heating means, which is used for heating gases to be flown into the through holes in the honeycomb filter upon carrying out a regenerating process for the honeycomb filter of the present invention, is installed therein.

With respect to the heating means, not particularly limited, for example, an electric heater, a burner or the like may be used.

The above-mentioned heating means is normally placed in the vicinity of the end face on the exhaust gas inlet side of the honeycomb filter placed inside the casing.

Next, the casing in which the honeycomb filter of the present invention and the heating means are installed is connected to an exhaust gas passage of an internal combustion engine.

More specifically, the end face of the casing on the side to which the heating means is attached is connected to the introduction pipe that is coupled to the internal combustion engine such as an engine, with the other end face being connected to the discharging pipe connected to the outside.

Further, a pump or the like, which allows gases to be used for the regenerating process of the honeycomb filter to flow into the honeycomb filter, is placed in the mid-portion of the introduction pipe or in the vicinity of the exhaust gas inlet side of the casing.

Upon carrying out the regenerating process of the honeycomb filter, the pump or the like thus installed allows gases heated by the heating means to flow into the honeycomb filter under conditions of a flow-in rate of 0.3 m/sec or more and an oxygen concentration of 6% or more.

Moreover, instead of installing the pump or the like, a device or the like capable of adjusting the flow-in rate and oxygen concentration of the exhaust gases discharged from an internal combustion engine such as an engine may be installed in the mid-portion of the introduction pipe or in the vicinity of the end face of the casing on the exhaust gas inlet side.

By carrying out the above-mentioned processes, it becomes possible to positively manufacture the honeycomb filter and the exhaust gas purifying device of the present invention.

BEST MODE FOR CARRYING OUT THE INVENTION

The following description will explain the present invention in detail by means of examples; however, the present invention is not intended to be limited by these examples.

EXAMPLES 1 AND 2, AND COMPARATIVE EXAMPLE 1

(1) Powder of $\alpha$-type silicon carbide having an average particle size of 5 $\mu$m (60% by weight) and powder of $\beta$-type silicon carbide having an average particle size of 0.5 $\mu$m (40% by weight) were wet-mixed, and to 100 parts by weight of the resulting mixture were added and kneaded 5 parts by weight of an organic binder (methyl cellulose) and 10 parts by weight of water to obtain a material paste. Next, after a slight amount of a plasticizer and a lubricant had been added to the material paste and this had been further kneaded, the resulting material paste was extrusion-formed by using dies which have different values, that is, 100 μm, 50 μm and 120 μm, in the surface roughness Ra of wall faces of thin pores directly made in contact with the material paste so that three kinds of raw formed bodies which have different values in the surface roughness of the inner walls of the openings that are formed in paralled with one another in the length direction were manufactured.

Next, the above-mentioned raw formed bodies were dried by using a micro-wave drier, and predetermined through holes were then filled with a paste having the same composition as the raw formed body, and after these had been again dried by using a drier, this was degreased at 400° C., and sintered at 2200° C. in a normal-pressure argon atmosphere for 3 hours to manufacture porous ceramic members, as shown in FIG. 3, each of which was made of a silicon carbide sintered body, and had a size of 34.4 mm×34.4 mm×300 mm, the number of through holes of 144, a length of the longest side l of 2.39 mm, a length L in the length direction of 300 mm and a thickness of the wall portion of 0.44 mm.

(2) Next, a number of the porous ceramic members were combined with one another by using a heat-resistant adhesive containing inorganic fibers such as ceramic fibers and the like and inorganic particles such as silicon carbide and the like, and then cut by using a diamond cutter; thus, a cylinder-shaped ceramic block having a diameter of 165 mm and a length of 300 mm, as shown in FIG. 2, was obtained.

Next, a sealing material layer was formed on the circumference of the ceramic block by using the heat resistant adhesive so that a cylinder-shaped honeycomb filter as shown in FIG. 2 was manufactured.

According to JIS B 0601, values of the surface roughness Ra of the inner wall of the through hole of the honeycomb filters thus manufactured were respectively 100 μm (Example 1), 50 μm (Example 2) and 120 μm (Comparative Example 1), with L/l being set to 125.5.

EXAMPLES 3 AND 4, AND COMPARATIVE EXAMPLE 2

(1) The same processes as those of Examples 1 and 2, and Comparative Example 1 were carried out except that, in (1) of Examples 1 and 2, and Comparative Example 1, the length L in the length direction of the porous ceramic member was set to 500 mm to obtain a porous ceramic member.

(2) The same processes as (2) of Examples 1 and 2, and Comparative Example 1 were carried out so that honeycomb filters in which values of the surface roughness Ra of the inner walls of the through hole were respectively 100 μm (Example 3), 50 μm (Example 4) and 120 μm (Comparative Example 2), with L/l being set to 209.2, were manufactured.

COMPARATIVE EXAMPLES 3 TO 5

(1) The same processes as those of Examples 1 and 2, and Comparative Example 1 were carried out in (1) of Examples 1 and 2, and Comparative Example 1, except that the length L in the length direction of the porous ceramic member was set to 100 mm to obtain a porous ceramic member.

(2) The same processes as (2) of Examples 1 and 2, and Comparative Example 1 were carried out so that honeycomb filters in which values of the surface roughness Ra of the inner walls of the through hole were respectively 100 μm (Comparative Example 3), 50 μm (Comparative Example 4) and 120 μm (Comparative Example 5), with L/l being set to 41.8, were manufactured.

EXAMPLES 5 AND 6, AND COMPARATIVE EXAMPLE 6

(1) The same processes as those of Examples 1 and 2, and Comparative Example 1 were carried out in (1) of Examples 1 and 2, and Comparative Example 1, except that the porous ceramic member had a size of 34.42 mm×34.42 mm×100 mm, the number of through holes of 324, a length of the longest side l of 1.49 and a length L in the length direction of 100 mm to manufacture a porous ceramic member.

(2) The same processes as (2) of Examples 1 and 2, and Comparative Example 1 were carried out so that honeycomb filters in which values of the surface roughness Ra of the inner wall of the through hole were respectively 100 μm (Example 5), 50 μm (Example 6) and 120 μm (Comparative Example 6), with L/l being set to 67.1, were manufactured.

EXAMPLES 7 AND 8, AND COMPARATIVE EXAMPLE 7

(1) The same processes as those of Examples 5 and 6, and Comparative Example 7 were carried out in (1) of Examples 5 and 6, and Comparative Example 6, except that the length L in the length direction of the porous ceramic member was set to 300 mm to manufacture a porous ceramic member.

(2) The same processes as (2) of Examples 1 and 2, and Comparative Example 1 were carried out so that honeycomb filters in which values of the surface roughness Ra of the inner wall of the through hole were respectively 100 μm (Example 7), 50 μm (Example 8) and 120 μm (Comparative Example 7), with L/l being set to 201.3, were manufactured.

EXAMPLES 9 AND 10, AND COMPARATIVE EXAMPLE 8

(1) The same processes as those of Examples 5 and 6, and Comparative Example 7 were carried out in (1) of Examples 5 and 6, and Comparative Example 6, except that the length L in the length direction of the porous ceramic member was set to 500 mm to manufacture a porous ceramic member.

(2) The same processes as (2) of Examples 1 and 2, and Comparative Example 1 were carried out so that honeycomb filters in which values of the surface roughness Ra of the inner wall of the through hole were respectively 100 μm (Example 9), 50 μm (Example 10) and 120 μm (Comparative Example 8), with L/l being set to 335.6 were manufactured.

EXAMPLES 11 AND 12, AND COMPARATIVE EXAMPLE 9

(1) The same processes as those of Examples 1 and 2 and Comparative Example 1 were carried out in (1) of Examples 1 and 2 and Comparative Example 1 except that the porous ceramic member had a size of 34.43 mm×34.43 mm×100 mm, the number of through holes of 484, a length of the longest side l of the through hole of 1.22 mm and a length L in the length direction of 100 mm to manufacture a porous ceramic member.

(2) The same processes as (2) of Examples 1 and 2, and Comparative Example 1 were carried out so that honeycomb filters in which values of the surface roughness Ra of the inner wall of the through hole were respectively 100 μm (Example 11), 50 μm (Example 12) and 120 μm (Comparative Example 9), with L/l being set to 82.0 were manufactured.

EXAMPLES 13 AND 14, AND COMPARATIVE EXAMPLE 10

(1) The same processes as those of Examples 11 and 12, and Comparative Example 9 were carried out in (1) of Examples 11 and 12, and Comparative Example 9, except that the length L in the length direction of the porous ceramic member was set to 300 mm to manufacture a porous ceramic member.

(2) The same processes as (2) of Examples 1 and 2, and Comparative Example 1 were carried out so that honeycomb filters in which values of the surface roughness Ra of the inner wall of the through hole were respectively 100 μm (Example 13), 50 μm (Example 14) and 120 μm (Comparative Example 10), with L/l being set to 245.9, were manufactured.

EXAMPLES 15 AND 16, AND COMPARATIVE EXAMPLE 11

(1) The same processes as those of Examples 11 and 12, and Comparative Example 9 were carried out in (1) of Examples 11 and 12, and Comparative Example 9, except that the length L in the length direction of the porous ceramic member was set to 500 mm to manufacture a porous ceramic member.

(2) The same processes as (2) of Examples 1 and 2, and Comparative Example 1 were carried out so that honeycomb filters in which values of the surface roughness Ra of the inner wall of the through hole were respectively 100 μm (Example 15), 50 μm (Example 16) and 120 μm (Comparative Example 11), with L/l being set to 409.8, were manufactured.

Each of the honeycomb filters manufactured in Examples 1 to 16 and Comparative Examples 1 to 11 was installed in the casing of the exhaust gas purifying device as shown in FIG. 4, and subjected to evaluation tests in which collecting process of particulates and regenerating processes were carried out repeatedly 100 times, and each of the resulting honeycomb filters was then taken out and cut. With respect to the cut face of each of the honeycomb filters, the regenerating state of particulates was visually observed, and the ratio of accumulated amounts of ashes (B/A) between the accumulated amount of ashes (A) in the vicinity of the end on the exhaust gas outlet side (point of ⅓ from the outlet side in the center of the filter) and the accumulated amount of ashes (B) in the vicinity of the end on the exhaust gas inlet side (point of ⅓ from the inlet side in the center of the filter) was measured. Here, the accumulated amount was measured by measuring the thickness of ashes. In the case where residual particulates remained, the measurements were carried out after those residual particulates had been burned in an electric furnace.

Here, in the above-mentioned regenerating process, by using the pump placed in the vicinity of the end on the exhaust gas inlet side of the casing, air (oxygen concentration: 21%) is flown through the honeycomb filter at a flow-in rate of 0.8 m/sec.

The results thereof are shown in the following Table 1.

TABLE 1

|  | l (mm) | L (mm) | L/l | S (mm$^2$) | L/S (mm$^{-1}$) | Ra (μm) | Presence/ absence of catalyst | Presence/ absence of particulates | Accumulated amount ratio of ashes |
|---|---|---|---|---|---|---|---|---|---|
| Example 1 | 2.39 | 300 | 125.5 | 5.71 | 52.52 | 100 | No | No | 0.04 |
| Example 2 | 2.39 | 300 | 125.5 | 5.71 | 52.52 | 50 | No | No | 0.05 |
| Example 3 | 2.39 | 500 | 209.2 | 5.71 | 87.53 | 100 | No | No | 0.06 |
| Example 4 | 2.39 | 500 | 209.2 | 5.71 | 87.53 | 50 | No | No | 0.08 |
| Example 5 | 1.49 | 100 | 67.1 | 2.22 | 45.04 | 100 | No | No | 0.03 |
| Example 6 | 1.49 | 100 | 67.1 | 2.22 | 45.04 | 50 | No | No | 0.04 |
| Example 7 | 1.49 | 300 | 201.3 | 2.22 | 135.13 | 100 | No | No | 0.06 |
| Example 8 | 1.49 | 300 | 201.3 | 2.22 | 135.13 | 50 | No | No | 0.08 |
| Example 9 | 1.49 | 500 | 335.6 | 2.22 | 225.22 | 100 | No | No | 0.07 |
| Example 10 | 1.49 | 500 | 335.6 | 2.22 | 225.22 | 50 | No | No | 0.08 |
| Example 11 | 1.22 | 100 | 82.0 | 1.49 | 67.19 | 100 | No | No | 0.06 |
| Example 12 | 1.22 | 100 | 82.0 | 1.49 | 67.19 | 50 | No | No | 0.12 |
| Example 13 | 1.22 | 300 | 245.9 | 1.49 | 201.56 | 100 | No | No | 0.06 |
| Example 14 | 1.22 | 300 | 245.9 | 1.49 | 201.56 | 50 | No | No | 0.07 |
| Example 15 | 1.22 | 500 | 409.8 | 1.49 | 335.93 | 100 | No | No | 0.08 |
| Example 16 | 1.22 | 500 | 409.8 | 1.49 | 335.93 | 50 | No | No | 0.09 |
| Comparative Example 1 | 2.39 | 300 | 125.5 | 5.71 | 52.52 | 120 | No | No | 0.85 |
| Comparative Example 2 | 2.39 | 500 | 209.2 | 5.71 | 87.53 | 120 | No | No | 0.89 |
| Comparative Example 3 | 2.39 | 100 | 41.8 | 5.71 | 17.51 | 100 | No | Yes | 0.22 |
| Comparative Example 4 | 2.39 | 100 | 41.8 | 5.71 | 17.51 | 50 | No | Yes | 0.26 |
| Comparative Example 5 | 2.39 | 100 | 41.8 | 5.71 | 17.51 | 120 | No | Yes | 0.81 |
| Comparative Example 6 | 1.49 | 100 | 67.1 | 2.22 | 45.04 | 120 | No | No | 0.88 |
| Comparative Example 7 | 1.49 | 300 | 201.3 | 2.22 | 135.13 | 120 | No | No | 0.89 |
| Comparative Example 8 | 1.49 | 500 | 335.6 | 2.22 | 225.22 | 120 | No | No | 0.94 |
| Comparative Example 9 | 1.22 | 100 | 82.0 | 1.49 | 67.19 | 120 | No | No | 0.90 |
| Comparative Example 10 | 1.22 | 300 | 245.9 | 1.49 | 201.56 | 120 | No | No | 0.92 |
| Comparative Example 11 | 1.22 | 500 | 409.8 | 1.49 | 335.93 | 120 | No | No | 0.94 |

As shown in Table 1, in the honeycomb filters relating to Examples 1 to 16, hardly any particulates were accumulated on the partition wall, and with respect to the ashes, almost all of them were separated from the partition wall and moved toward the exhaust gas outlet side.

Figure 8:
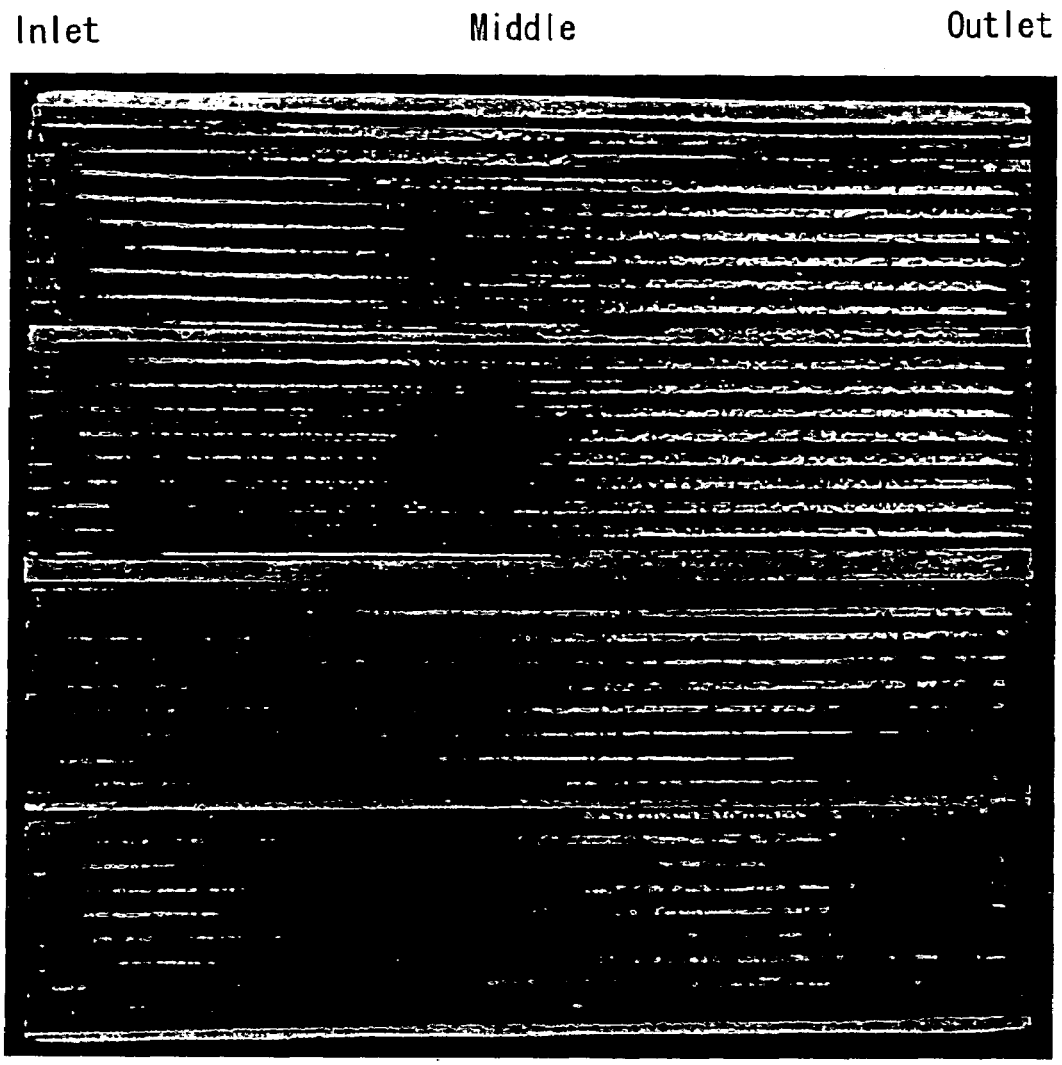
FIG. 8(a) is a cross-sectional photograph taken by cutting a porous ceramic member of a honeycomb filter relating to Example 1 in the direction parallel to the length direction thereof.
FIG. 8(b) shows partially enlarged photographs on the exhaust gas inlet side, in the center portion and on the exhaust gas outlet side of the cross-sectional photographs taken by cutting a porous ceramic member of a honeycomb filter relating to Example 1 in a direction perpendicular to the length direction of the porous ceramic member.
Figure 8:
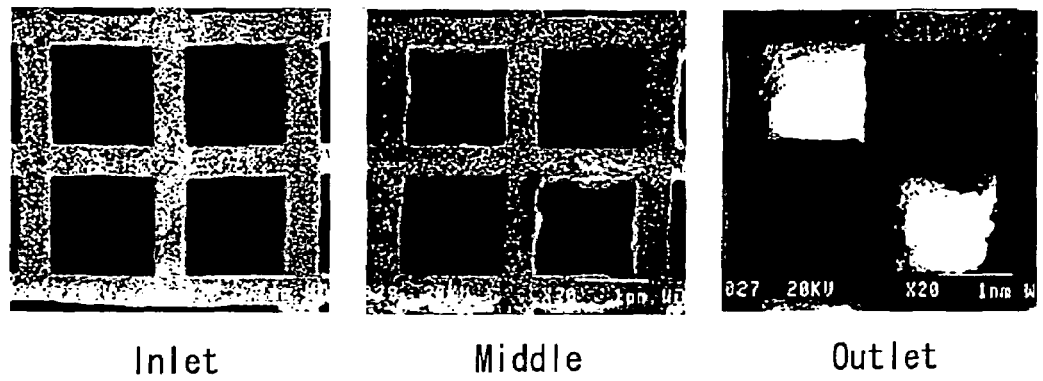

Here, FIG. 8(a) is a cross-sectional photograph taken by cutting a honeycomb filter relating to Example 1 that has been subjected to the evaluation test in the direction parallel to the length direction of the porous ceramic member; and FIG. 8(b) shows partially enlarged photographs on the exhaust gas inlet side, in the center portion and on the exhaust gas outlet side of the cross-sectional photographs taken by cutting a porous ceramic member of a honeycomb filter relating to Example 1 in a direction perpendicular to the length direction of the porous ceramic member.

As shown in FIGS. 8(a) and 8(b), in the honeycomb filter relating to Example 1, it was visually confirmed that hardly any particulates were accumulated on the partition wall, while ashes were accumulated on the exhaust gas outlet side of the through hole.

In the honeycomb filters relating to Examples 2 to 16 also, the almost same state was confirmed.

In contrast, in the honeycomb filters relating to Comparative Examples 1 and 2, and Comparative Examples 6 to 11, although hardly any particulates were accumulated on the partition wall, ashes remained on the partition wall in an almost even state. Moreover, in the honeycomb filters relating to Comparative Examples 3 and 4, many particulates were left on the partition wall without having been burned completely; however, when confirmed after the particulates had been burned, most of ashes were separated from the partition wall, and moved toward the exhaust gas outlet side of the through hole. Moreover, in the case of the honeycomb filter relating to Comparative Example 5, many particulates were left on the partition wall without having been burned, and the ashes remained on the partition wall in an almost even state.

Figure 9:
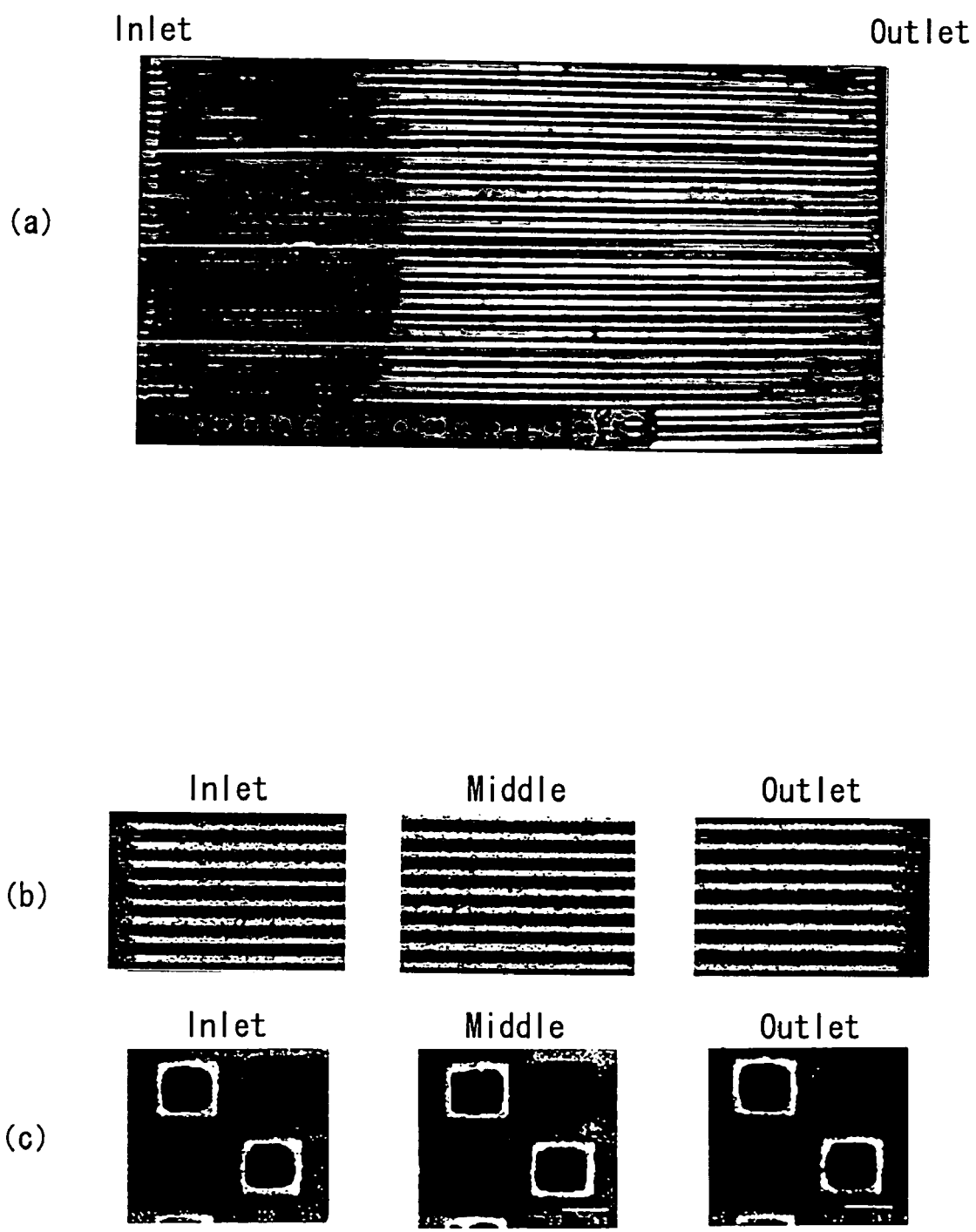
FIG. 9(a) is a cross-sectional photograph taken by cutting a porous ceramic member of a honeycomb filter relating to Comparative Example 1 in the direction parallel to the length direction thereof.
FIG. 9(b) shows partially enlarged photographs on the exhaust gas inlet side, in the center portion and on the exhaust gas outlet side of the cross-sectional photographs shown in FIG. 9(a)
FIG. 9(c) shows cross-sectional photographs on the exhaust gas inlet side, in the center portion and on the exhaust gas outlet side, taken by cutting a porous ceramic member of a honeycomb filter relating to Comparative Example 1 in a direction perpendicular to the length direction thereof.

Here, FIG. 9(a) is a cross-sectional photograph that shows a cross-section of the honeycomb filter relating to Comparative Example 1, taken in parallel with the length direction of the porous ceramic member, FIG. 9(b) shows partially enlarged cross-sectional photographs that show cross-sections of the honeycomb filter of FIG. 9(a) on the exhaust gas inlet side, in the center portion and on the exhaust gas outlet side, and FIG. 9(c) shows partially enlarged cross-sectional photographs perpendicular to the length direction of the porous ceramic member that show cross-sections of the honeycomb filter relating to Comparative Example 1 on the exhaust gas inlet side, in the center portion and on the exhaust gas outlet side.

As shown in FIGS. 9(a) to 9(c), in the honeycomb filter relating to Comparative Example 1, it was visually confirmed that, although hardly any particulates were accumulated on the partition wall, ashes were accumulated on the entire face of the partition wall in an almost even state.

In the honeycomb filters relating to Comparative Examples 2, 6 to 11 also, the almost same state was confirmed.

As clearly indicated by the results shown in Table 1, in the case where the length l of the longest side of the through hole of the honeycomb filter and the length L of the porous ceramic member are located in a range of $60 \leq L/l \leq 500$, while the area S of the through hole of the honeycomb filter and the length L of the porous ceramic member are located in a range of $20 \leq L/S \leq 400$, it is possible to burn and remove particulates accumulated on the partition wall almost completely, and in the case where the surface roughness Ra of the inner walls of the through hole satisfies $Ra \leq 100$ μm, it becomes possible to easily separate the residual ashes on the partition wall, and consequently to easily move the ashes inside the through hole by utilizing gases that are flown through the through hole in the regenerating process of the honeycomb filter.

EXAMPLES 17 AND 18, AND COMPARATIVE EXAMPLE 12

The honeycomb filter relating to Example 1 was placed in the casing of the exhaust gas purifying device as shown in FIG. 4 by using the method as explained in the detailed description of the invention so that an exhaust gas purifying device was manufactured. In the vicinity of the end of the casing on the exhaust gas inlet side of the exhaust gas purifying device, a pump, which enables air (oxygen concentration: 21%) to flow into the honeycomb filter at a desired flow-in rate in the regenerating process of the honeycomb filter, and a back pressure sensor, which measures a pressure loss in the honeycomb filter, were installed.

Here, in the regenerating process of the honeycomb filter, values of the flow-in rate of air to be flown into the honeycomb filter were respectively set to 0.3 m/sec (Example 17), 1.0 m/sec (Example 18) and 0.2 m/sec (Comparative Example 12).

EXAMPLES 19 AND 20, AND COMPARATIVE EXAMPLE 13

The same processes as Examples 17 and 18, and Comparative Example 12 were carried out except that the honeycomb filter relating to Example 2 was used so that an exhaust gas purifying device was manufactured.

Here, in the regenerating process of the honeycomb filter, values of the flow-in rate of air to be flown into the honeycomb filter were respectively set to 0.3 m/sec (Example 19), 1.0 m/sec (Example 20) and 0.2 m/sec (Comparative Example 13).

COMPARATIVE EXAMPLES 14 AND 15

The same processes as Examples 17 and 18, and Comparative Example 12 were carried out except that the honeycomb filter relating to Comparative Example 1 was used so that an exhaust gas purifying device was manufactured.

Here, in the regenerating process of the honeycomb filter, values of the flow-in rate of air to be flown into the honeycomb filter were respectively set to 0.3 m/sec (Comparative Example 14) and 1.0 m/sec (Comparative Example 15).

COMPARATIVE EXAMPLES 16 AND 17

The same processes as Examples 17 and 18, and Comparative Example 12 were carried out except that the honeycomb filter relating to Comparative Example 3 was used so that an exhaust gas purifying device was manufactured.

Here, in the regenerating process of the honeycomb filter, values of the flow-in rate of air to be flown into the honeycomb filter were respectively set to 0.3 m/sec (Comparative Example 16) and 1.0 m/sec (Comparative Example 17).

EXAMPLES 21 TO 24

The same processes as Examples 17 to 20 were carried out except that in the regenerating process of the honeycomb filter, the gas to be flown into the honeycomb filter was changed to an oxygen-nitrogen mixed gas having an oxygen concentration of 6%.

COMPARATIVE EXAMPLES 18 TO 21

The same processes as Examples 17 to 20 were carried out except that in the regenerating process of the honeycomb filter, the gas to be flown into the honeycomb filter is changed to an oxygen-nitrogen mixed gas having an oxygen concentration of 4%.

Each of the exhaust gas purifying devices manufactured in Examples 17 to 24 and Comparative Examples 12 to 21 was installed in an exhaust gas passage of an engine, and subjected to evaluation tests in which collecting processes of particulates and regenerating processes of the honeycomb filter were carried out repeatedly 100 times, so that the pressure loss in the initial stage (hereinafter, referred to as the initial pressure loss) of each honeycomb filter after each of the regenerating processes was measured. Moreover, after the evaluation tests, each of the honeycomb filters that had been used in each of the exhaust gas purifying devices was then taken out and cut; thus, the ratio of accumulated amounts of ashes (B/A) between the accumulated amount of ashes (A) in the vicinity of the end on the exhaust gas outlet side and the accumulated amount of ashes (B) in the vicinity of the end on the exhaust gas inlet side was measured. Here, the accumulated amount was measured by measuring the thickness of ashes.

The results thereof are shown in the following Table 2 and FIG. 10.

TABLE 2

| | Filter | Oxygen concentration of flow-in gas (%) | Flow-in rate (m/sec) | Accumulated amount ratio of ashes |
|---|---|---|---|---|
| Example 17 | Example 1 | 21 | 0.3 | 0.08 |
| Example 18 | Example 1 | 21 | 1.0 | 0.03 |
| Example 19 | Example 2 | 21 | 0.3 | 0.09 |
| Example 20 | Example 2 | 21 | 1.0 | 0.04 |
| Example 21 | Example 1 | 6 | 0.3 | 0.12 |
| Example 22 | Example 1 | 6 | 1.0 | 0.10 |
| Example 23 | Example 2 | 6 | 0.3 | 0.15 |
| Example 24 | Example 2 | 6 | 1.0 | 0.13 |
| Comparative Example 12 | Example 1 | 21 | 0.2 | 0.79 |
| Comparative Example 13 | Example 2 | 21 | 0.2 | 0.75 |
| Comparative Example 14 | Comparative Example 1 | 21 | 0.3 | 0.85 |
| Comparative Example 15 | Comparative Example 1 | 21 | 1.0 | 0.75 |
| Comparative Example 16 | Comparative Example 3 | 21 | 0.3 | 0.55 |
| Comparative Example 17 | Comparative Example 3 | 21 | 1.0 | 0.45 |
| Comparative Example 18 | Example 1 | 4 | 0.3 | 0.32 |
| Comparative Example 19 | Example 1 | 4 | 1.0 | 0.41 |
| Comparative Example 20 | Example 2 | 4 | 0.3 | 0.45 |
| Comparative Example 21 | Example 2 | 4 | 1.0 | 0.51 |

As shown in Table 2, in the honeycomb filters of the exhaust gas purifying devices relating to Examples 17 to 24, ashes were accumulated on the exhaust gas outlet side of the through hole, with hardly any ashes being left on the partition wall on the exhaust gas inlet side and center portion of the through hole.

In contrast, in the honeycomb filters of the exhaust gas purifying devices relating to Comparative Examples 12 to 15, ashes are left on the partition wall in an almost even state.

Figure 10:
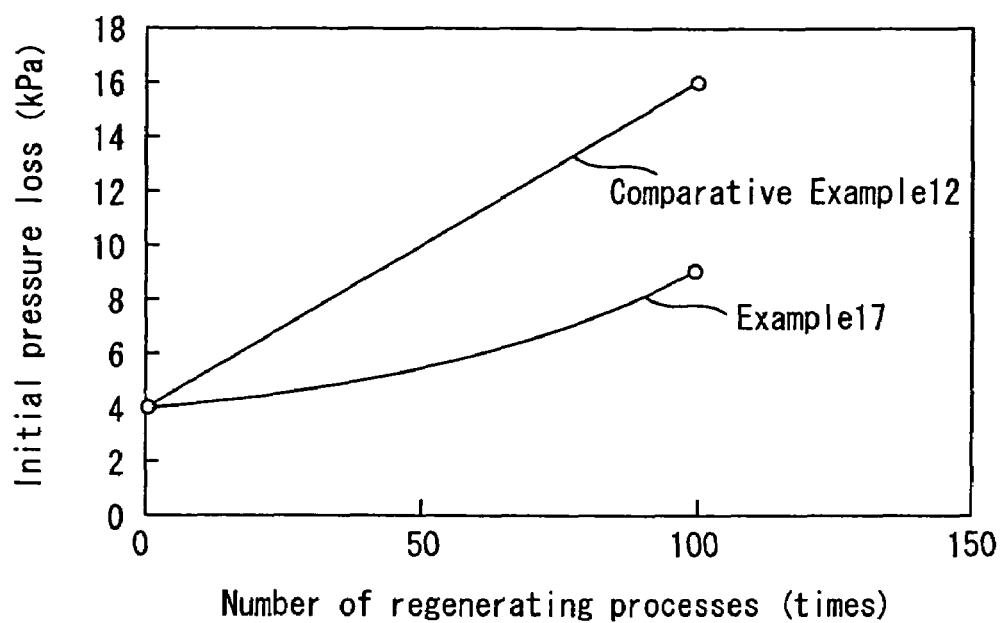
FIG. 10 is a graph that shows a relationship between the number of regenerating processes and the initial pressure loss of a honeycomb filter relating to each of Example 17 and Comparative Example 12.

Moreover, FIG. 10 shows a graph that indicates the relationship between: the number of regenerating processes of each of the honeycomb filters relating to Example 17 and Comparative Example 12; and the initial pressure loss in each of the honeycomb filters after the regenerating processes.

As shown in FIG. 10, in the case of the honeycomb filter relating to Example 17, the initial pressure loss after the first regenerating process is 4 kPa, and the initial pressure loss gradually increases in the quadric curve; thus, the initial pressure loss after the $100^{th}$ regenerating process shows 9 kPa; thus, it is possible to maintain a low level in the initial pressure loss for a long time.

Here, with respect to the relationship between the number of regenerating processes and the initial pressure loss of each of the honeycomb filters relating to Examples 18 to 24, the almost same relationship as that of Example 17 was obtained.

Therefore, in the exhaust gas purifying devices relating to Examples 17 to 24, it is possible to maintain a wide filtering-permissible area in the honeycomb filter even after the above-mentioned evaluation tests; thus, it becomes possible to prevent the initial pressure loss of the honeycomb filter from becoming too high after the regenerating processes, and consequently to continuously use the filter even after the above-mentioned evaluation tests.

In contrast, in the case of the honeycomb filter relating to Comparative Example 12, although the initial pressure loss after the first regenerating process is 4 kPa, the initial pressure loss increases linearly in a comparatively steep manner; thus, the initial pressure loss after the $100^{th}$ regenerating process shows 16 kPa; consequently, the initial pressure loss easily becomes higher.

Here, with respect to the relationship between the number of regenerating processes and the initial pressure loss of each of the honeycomb filters relating to Comparative Examples 13 to 15, the almost same relationship as that of Comparative Example 12 was obtained.

Therefore, in the case of the exhaust gas purifying devices relating to Comparative Examples 12 to 15, clogging occurs in the partition wall of the honeycomb filter due to ashes after the above-mentioned evaluation tests to cause a high initial pressure loss in the honeycomb filter; consequently, the honeycomb filter needs to be washed through water-washing or the like after the evaluation tests, making it impossible to use the filter continuously.

Moreover, in the case of the honeycomb filter of each of the exhaust gas purifying devices relating to Comparative Examples 16 and 17, although a portion of ashed is accumulated on the exhaust gas outlet side of the through hole, ashes are left on the partition wall on the exhaust gas inlet side and the center portion of the through hole together with many particulates to easily make the initial pressure loss after the regenerating process higher; thus, the particulate-regenerating process needs to be carried out more frequently in comparison with the exhaust gas purifying devices relating to Examples 17 to 20. Moreover, although the exhaust gas purifying devices relating to Comparative Examples 16 and 17 require no washing process of the honeycomb filter through water-washing or the like immediately after the evaluation test, these devices require the washing process in a shorter period of time in comparison with the exhaust gas purifying devices relating to Examples 17 to 24.

Moreover, in the honeycomb filter of each of the exhaust gas purifying devices relating to Comparative Examples 18 to 21, the particulates are insufficiently burned to remain, resulting in a higher accumulated amount of ashes.

As clearly indicated by the results shown in Table 2, in the regenerating process of the honeycomb filter in the exhaust gas purifying device using the honeycomb filter of the present invention, by setting the flow-in rate of gases to flow into the honeycomb filter to 0.3 m/sec or more, it becomes possible to move residual ashes on the partition wall toward the exhaust gas outlet side of the through hole, to maintain a wide filtering-permissible area in the partition wall, and consequently to use the honeycomb filter continuously for a long time.

Moreover, in the case where, for example, the flow-in rate of gases to flow into the honeycomb filter is set to 0.3 m/sec or more in the regenerating process of the honeycomb filter, it is not possible to move residual ashes on the partition wall toward the exhaust gas outlet side of the through hole, without using the honeycomb filter of the present invention; consequently, it is not possible to use the filter for a long time.

Moreover, when the oxygen concentration of gases to be flown into the honeycomb filter is low, the particulates are not sufficiently burned to remain thereon; thus, the accumulated amount of ashes becomes higher.

EXAMPLES 25 AND 26, AND REFERENCE EXAMPLE 1

(1) Powder of α-type silicon carbide having an average particle size of 5 μm (60% by weight) and powder of β-type silicon carbide having an average particle size of 0.5 μm (40% by weight) were wet-mixed, and to 100 parts by weight of the resulting mixture were added and kneaded 5 parts by weight of an organic binder (methyl cellulose) and 10 parts by weight of water to obtain a material paste. Next, after a slight amount of a plasticizer and a lubricant had been added to the material paste and this had been further kneaded, the resulting material paste was extrusion-formed by using a die which has 0.1 μm in the surface roughness Ra of wall faces of thin pores directly made in contact with the material paste so that a raw formed body in which multiple of through holes were arranged in paralled with one another in the length direction with partition wall interposed therebetween was manufactured.

Next, after the above-mentioned raw formed body had been dried by using a microwave drier, predetermined through holes were filled with a paste having the same composition as the raw formed body, and this was again dried by using a drier.

Next, the raw formed body was subjected to a degreasing process at 400° C., and sintered at 2200° C. for 3 hours, with argon gas being flown through all the through holes of the raw formed body at a flow-in rate of 15 m/sec (Example 25), 12 m/sec (Example 26) or 5 m/sec (Reference Example 1) respectively. Thus, as shown in FIG. 3, porous ceramic members, each of which was made of a silicon carbide sintered body, and had a size of 34.4 mm×34.4 mm×300 mm, the number of through holes of 144, a length of the longest side l of 2.39, an area S of the through hole in the cross section perpendicular to the length direction of 5.71 mm$^2$, a length L in the length direction of 300 mm and a thickness of the wall portion of 0.44 mm, were prepared.

(2) Next, a number of the porous ceramic members were combined with one another by using a heat-resistant adhesive containing inorganic fibers such as ceramic fibers and the like and inorganic particles such as silicon carbide and the like, and then cut by using a diamond cutter; thus, a cylinder-shaped ceramic block having a diameter of 165 mm and a length of 300 mm, as shown in FIG. 2, was obtained.

Next, a sealing material layer was formed on the circumference of the ceramic block by using the heat resistant adhesive so that a cylinder-shaped honeycomb filter as shown in FIG. 2 was manufactured.

According to JIS B 0601, values of the surface roughness Ra of the inner wall of the through hole of the honeycomb filters thus manufactured were respectively 10 μm (Example 25), 1 μm (Example 26) and 0.5 μm (Reference Example 1) with L/l and L/S being respectively set to 125.5 and 21.97.

EXAMPLES 27 AND 28, AND COMPARATIVE EXAMPLE 22

(1) Powder of α-type silicon carbide having an average particle size of 5 μm (60% by weight) and powder of β-type silicon carbide having an average particle size of 0.5 μm (40% by weight) were wet-mixed, and to 100 parts by weight of the resulting mixture were added and kneaded 5 parts by weight of an organic binder (methyl cellulose) and 10 parts by weight of water to obtain a material paste. Next, after a slight amount of a plasticizer and a lubricant had been added to the material paste and this had been further kneaded, the resulting material paste was extrusion-formed by using dies which have different values, that is, 100 μm, 50 μm and 120 μm, in the surface roughness Ra of wall faces of thin pores directly made in contact with the material paste so that three kinds of raw formed bodies which have different values in the surface roughness of the inner walls of the openings that are formed in paralled with one another in the length direction were manufactured.

Next, the above-mentioned raw formed bodies were dried by using a microwave drier, and predetermined through holes were then filled with a paste having the same composition as the raw formed body, and after these had been again dried by using a drier, this was degreased at 400° C., and sintered at 2200° C. in a normal-pressure argon atmosphere for 3 hours to manufacture porous ceramic members, as shown in FIG. 3, each of which was made of a silicon carbide sintered body, and had a size of 34.4 mm×34.4 mm×300 mm, the number of through holes of 144, a length of the longest side l of 2.39, a length L in the length direction of 300 mm and a thickness of the partition wall of 0.44 mm.

Further, each of the porous ceramic members was immersed into hydrofluoric acid (concentration: 0.1%) for 5 minutes so that the surface thereof was modified.

(2) Al(NO$_3$)$_3$ was added to 1,3-butane diol, and this mixture was stirred at 60° C. for 5 hours so that a 1,3-butane diol solution containing 30% by weight of Al(NO$_3$)$_3$ was prepared. After the porous ceramic member had been immersed into this 1,3-butane diol solution, the resulting porous ceramic member was heated at 150° C. for 2 hours, and then also heated at 400° C. for 2 hours, and after having been further immersed in water at 80° C. for 2 hours, this was heated at 700° C. for 8 hours so that an alumina layer was formed on the surface of the porous ceramic member.

Ce(NO$_3$)$_3$ was added to ethylene glycol, and this mixture was stirred at 90° C. for 5 hours so that an ethylene glycol solution containing 6% by weight of Ce(NO$_3$)$_3$ was prepared. After the porous ceramic member had been immersed into this ethylene glycol solution, the resulting porous ceramic member was heated at 150° C. for 2 hours, and then also heated at 650° C. for 2 hours in a nitrogen atmosphere so that an alumina layer containing a rare-earth oxide, which was used for supporting a catalyst, was formed on the surface of the porous ceramic member.

A nitric acid solution of dinitro diammine platinum ([Pt(NH$_3$)$_2$(NO$_2$)$_2$]HNO$_3$) containing 4.53% by weight of platinum was diluted by distilled water, and the porous ceramic member having a water-absorbing amount of 28.0 g/L was immersed into this solution so that it contained 2 g/L of Pt, and the resulting porous ceramic member was then heated at 110° C. for 2 hours, and further heated in a nitrogen atmosphere at 500° C. for 1 hour so that a platinum catalyst was supported on the surface of the porous ceramic member.

(3) Next, a number of the porous ceramic members were combined with one another by using a heat-resistant adhesive containing inorganic fibers such as ceramic fibers and the like and inorganic particles such as silicon carbide and the like, and this was then cut by using a diamond cutter so that a cylinder-shaped ceramic block, shown in FIG. 2, having a diameter of 165 mm and a length of 300 mm was formed.

Next, a sealing material layer was formed on the circumference of the ceramic block by using the heat resistant adhesive so that a cylinder-shaped honeycomb filter as shown in FIG. 2 was manufactured.

According to JIS B 0601, values of the surface roughness Ra of the inner wall of the through hole of the honeycomb filters thus manufactured were respectively 100 μm (Example 27), 50 μM (Example 28) and 120 μm (Comparative Example 22), with L/l being set to 125.5.

EXAMPLES 29 AND 30, AND REFERENCE EXAMPLE 2

(1) Powder of α-type silicon carbide having an average particle size of 5 μm (60% by weight) and powder of β-type silicon carbide having an average particle size of 0.5 μm (40% by weight) were wet-mixed, and to 100 parts by weight of the resulting mixture were added and kneaded 5 parts by weight of an organic binder (methyl cellulose) and 10 parts by weight of water to obtain a material paste. Next, after a slight amount of a plasticizer and a lubricant had been added to the material paste and this had been further kneaded, the resulting material paste was extrusion-formed by using a die which has 0.1 μm in the surface roughness Ra of wall faces of thin pores directly made in contact with the material paste so that a raw formed body in which multiple of through holes were arranged in paralled with one another in the length direction with partition wall interposed therebetween was manufactured.

Next, after the above-mentioned raw formed body had been dried by using a microwave drier, predetermined through holes were filled with a paste having the same composition as the raw formed body, and this was again dried by using a drier.

Next, the raw formed body was subjected to a degreasing process at 400° C. in a manner so as to allow argon gas to flow through all the through holes of the raw formed body at a flow-in rate of 15 m/sec (Example 29), 12 m/sec (Example 30) or 5 m/sec (Reference Example 2).

Successively, the raw formed body was subjected to a sintering process at 2200° C. for 3 hours in a manner so as to allow hydrogen gas to flow through all the through holes of the raw formed body at a flow-in rate of 15 m/sec (Example 29), 12 m/sec (Example 30) or 5 m/sec (Reference Example 2).

Consequently, as shown in FIG. 3, porous ceramic members, each of which was made of a silicon carbide sintered body, and had a size of 34.4 mm×34.4 mm×300 mm, the number of through holes of 144, a length of the longest side l of 2.39, an area S of the through hole in the cross section perpendicular to the length direction of 5.71 mm$^2$, a length L in the length direction of 300 mm and a thickness of the wall portion of 0.44 mm, were prepared.

Further, each of the porous ceramic members was immersed into hydrofluoric acid (concentration: 0.1%) for 5 minutes so that the nature of the surface thereof was modified.

(2) Al(NO$_3$)$_3$ was added to 1,3-butane diol, and this mixture was stirred at 60° C. for 5 hours so that a 1,3-butane diol solution containing 30% by weight of Al(NO$_3$)$_3$ was prepared. After the porous ceramic member had been immersed into this 1,3-butane diol solution, the resulting porous ceramic member was heated at 150° C. for 2 hours, and then also heated at 400° C. for 2 hours, and after having been further immersed in water at 80° C. for 2 hours, this was heated at 700° C. for 8 hours so that an alumina layer was formed on the surface of the porous ceramic member.

Ce(NO$_3$)$_3$ was added to ethylene glycol, and this mixture was stirred at 90° C. for 5 hours so that an ethylene glycol solution containing 6% by weight of Ce(NO$_3$)$_3$ was prepared. After the porous ceramic member had been immersed into this ethylene glycol solution, the resulting porous ceramic member was heated at 150° C. for 2 hours, and then also heated at 650° C. for 2 hours in a nitrogen atmosphere so that an alumina layer containing a rare-earth oxide, which was used for supporting a catalyst, was formed on the surface of the porous ceramic member.

A nitric acid solution of dinitro diammine platinum ([Pt(NH$_3$)$_2$(NO$_2$)$_2$]HNO$_3$) containing 4.53% by weight of platinum was diluted by distilled water, and the porous ceramic member having a water-absorbing amount of 28.0 g/L was immersed into this solution so that it contained 2 g/L of Pt, and the resulting porous ceramic member was then heated at 110° C. for 2 hours, and further heated in a nitrogen atmosphere at 500° C. for 1 hour so that a platinum catalyst was supported on the surface of the porous ceramic member.

(3) The same processes as (2) of Examples 25 and 26, and Reference Example 1, were carried out so that a cylinder-shaped honeycomb filter was manufactured.

According to JIS B 0601, values of the surface roughness Ra of the inner wall of the through hole of the honeycomb filters thus manufactured were respectively 10 μm (Example 29), 1 μm (Example 30) and 0.5 μm (Reference Example 2) with L/l and L/S being respectively set to 125.5 and 21.97.

EXAMPLES 31 TO 72, REFERENCE EXAMPLES 3 TO 16, AND COMPARATIVE EXAMPLES 23 TO 50

The same processes as those of Examples 1, 2 and 25 to 30, Comparative Example 1 and Reference Examples 1 and 2 were carried out, except that, upon manufacturing the porous ceramic members, the longest side l of the through hole and the area S of the through hole on the cross section perpendicular to the length direction were adjusted, while the length L in the length direction was adjusted, by adjusting the number of the through holes and the size of each through hole, as shown in Tables 3 to 6, so that honeycomb filters having a cylinder shape were manufactured.

Each of the honeycomb filters manufactured in Examples 25 to 72, Reference Examples 1 to 16 and Comparative Examples 22 to 50 was placed in a casing of an exhaust gas purifying device as shown in FIG. 4, and after having been subjected to evaluation tests in which particulate collecting and regenerating processes were repeated 100 times, each of the honeycomb filters was taken out and cut. With respect to the cut face of each of the honeycomb filters, the regenerating state of particulates was visually observed, and the ratio of accumulated amounts of ashes (B/A) between the accumulated amount of ashes (A) in the vicinity of the end on the exhaust gas outlet side and the accumulated amount of ashes (B) in the vicinity of the end on the exhaust gas inlet side was measured. Here, the accumulated amount was measured by measuring the thickness of ashes.

Here, in the above-mentioned regenerating process, by using the pump placed in the vicinity of the end on the exhaust gas inlet side of the casing, air (oxygen concentration: 21%) is flown through the honeycomb filter at a flow-in rate of 0.8 m/sec.

The results of the tests are shown in Tables 3 to 6.

TABLE 3

| | l (mm) | L (mm) | L/l | S (mm$^2$) | L/S (mm$^{-1}$) | Ra (μm) | Presence/absence of catalyst | Presence/absence of particulates | Accumulated amount ratio of ashes |
|---|---|---|---|---|---|---|---|---|---|
| Example 25 | 2.39 | 300 | 125.5 | 5.71 | 52.52 | 10 | No | No | 0.05 |
| Example 26 | 2.39 | 300 | 125.5 | 5.71 | 52.52 | 1 | No | No | 0.12 |
| Example 27 | 2.39 | 300 | 125.5 | 5.71 | 52.52 | 100 | Yes | No | 0.04 |
| Example 28 | 2.39 | 300 | 125.5 | 5.71 | 52.52 | 50 | Yes | No | 0.04 |
| Example 29 | 2.39 | 300 | 125.5 | 5.71 | 52.52 | 10 | Yes | No | 0.04 |
| Example 30 | 2.39 | 300 | 125.5 | 5.71 | 52.52 | 1 | Yes | No | 0.10 |
| Example 31 | 2.39 | 500 | 209.2 | 5.71 | 87.53 | 10 | No | No | 0.06 |
| Example 32 | 2.39 | 500 | 209.2 | 5.71 | 87.53 | 1 | No | No | 0.10 |
| Example 33 | 2.39 | 500 | 209.2 | 5.71 | 87.53 | 100 | Yes | No | 0.05 |
| Example 34 | 2.39 | 500 | 209.2 | 5.71 | 87.53 | 50 | Yes | No | 0.07 |
| Example 35 | 2.39 | 500 | 209.2 | 5.71 | 87.53 | 10 | Yes | No | 0.05 |
| Example 36 | 2.39 | 500 | 209.2 | 5.71 | 87.53 | 1 | Yes | No | 0.09 |
| Example 37 | 1.49 | 100 | 67.1 | 2.22 | 45.04 | 10 | No | No | 0.07 |
| Example 38 | 1.49 | 100 | 67.1 | 2.22 | 45.04 | 1 | No | No | 0.15 |
| Example 39 | 1.49 | 100 | 67.1 | 2.22 | 45.04 | 100 | Yes | No | 0.02 |
| Example 40 | 1.49 | 100 | 67.1 | 2.22 | 45.04 | 50 | Yes | No | 0.03 |
| Example 41 | 1.49 | 100 | 67.1 | 2.22 | 45.04 | 10 | Yes | No | 0.06 |
| Example 42 | 1.49 | 100 | 67.1 | 2.22 | 45.04 | 1 | Yes | No | 0.13 |
| Example 43 | 1.49 | 300 | 201.3 | 2.22 | 135.13 | 10 | No | No | 0.06 |
| Example 44 | 1.49 | 300 | 201.3 | 2.22 | 135.13 | 1 | No | No | 0.10 |
| Example 45 | 1.49 | 300 | 201.3 | 2.22 | 135.13 | 100 | Yes | No | 0.05 |
| Example 46 | 1.49 | 300 | 201.3 | 2.22 | 135.13 | 50 | Yes | No | 0.07 |
| Example 47 | 1.49 | 300 | 201.3 | 2.22 | 135.13 | 10 | Yes | No | 0.05 |
| Example 48 | 1.49 | 300 | 201.3 | 2.22 | 135.13 | 1 | Yes | No | 0.09 |

TABLE 4

| | l (mm) | L (mm) | L/l | S (mm$^2$) | L/S (mm$^{-1}$) | Ra (μm) | Presence/absence of catalyst | Presence/absence of particulates | Accumulated amount ratio of ashes |
|---|---|---|---|---|---|---|---|---|---|
| Example 49 | 1.49 | 500 | 335.6 | 2.22 | 225.22 | 10 | No | No | 0.07 |
| Example 50 | 1.49 | 500 | 335.6 | 2.22 | 225.22 | 1 | No | No | 0.11 |
| Example 51 | 1.49 | 500 | 335.6 | 2.22 | 225.22 | 100 | Yes | No | 0.05 |
| Example 52 | 1.49 | 500 | 335.6 | 2.22 | 225.22 | 50 | Yes | No | 0.07 |
| Example 53 | 1.49 | 500 | 335.6 | 2.22 | 225.22 | 10 | Yes | No | 0.05 |
| Example 54 | 1.49 | 500 | 335.6 | 2.22 | 225.22 | 1 | Yes | No | 0.10 |
| Example 55 | 1.22 | 100 | 82.0 | 1.49 | 67.19 | 10 | No | No | 0.12 |
| Example 56 | 1.22 | 100 | 82.0 | 1.49 | 67.19 | 1 | No | No | 0.24 |
| Example 57 | 1.22 | 100 | 82.0 | 1.49 | 67.19 | 100 | Yes | No | 0.05 |
| Example 58 | 1.22 | 100 | 82.0 | 1.49 | 67.19 | 50 | Yes | No | 0.10 |
| Example 59 | 1.22 | 100 | 82.0 | 1.49 | 67.19 | 10 | Yes | No | 0.11 |
| Example 60 | 1.22 | 100 | 82.0 | 1.49 | 67.19 | 1 | Yes | No | 0.22 |
| Example 61 | 1.22 | 300 | 245.9 | 1.49 | 201.56 | 10 | No | No | 0.07 |
| Example 62 | 1.22 | 300 | 245.9 | 1.49 | 201.56 | 1 | No | No | 0.09 |
| Example 63 | 1.22 | 300 | 245.9 | 1.49 | 201.56 | 100 | Yes | No | 0.05 |
| Example 64 | 1.22 | 300 | 245.9 | 1.49 | 201.56 | 50 | Yes | No | 0.05 |
| Example 65 | 1.22 | 300 | 245.9 | 1.49 | 201.56 | 10 | Yes | No | 0.06 |
| Example 66 | 1.22 | 300 | 245.9 | 1.49 | 201.56 | 1 | Yes | No | 0.08 |
| Example 67 | 1.22 | 500 | 409.8 | 1.49 | 335.93 | 10 | No | No | 0.09 |
| Example 68 | 1.22 | 500 | 409.8 | 1.49 | 335.93 | 1 | No | No | 0.13 |
| Example 69 | 1.22 | 500 | 409.8 | 1.49 | 335.93 | 100 | Yes | No | 0.06 |
| Example 70 | 1.22 | 500 | 409.8 | 1.49 | 335.93 | 50 | Yes | No | 0.08 |
| Example 71 | 1.22 | 500 | 409.8 | 1.49 | 335.93 | 10 | Yes | No | 0.08 |
| Example 72 | 1.22 | 500 | 409.8 | 1.49 | 335.93 | 1 | Yes | No | 0.10 |

TABLE 5

| | l (mm) | L (mm) | L/l | S (mm$^2$) | L/S (mm$^{-1}$) | Ra (μm) | Presence/absence of catalyst | Presence/absence of particulates | Accumulated amount ratio of ashes |
|---|---|---|---|---|---|---|---|---|---|
| Reference Example 1 | 2.39 | 300 | 125.5 | 5.71 | 52.52 | 0.5 | No | No | 0.20 |
| Reference Example 2 | 2.39 | 300 | 125.5 | 5.71 | 52.52 | 0.5 | Yes | No | 0.18 |
| Reference Example 3 | 2.39 | 500 | 209.2 | 5.71 | 87.53 | 0.5 | No | No | 0.15 |

TABLE 5-continued

| | l (mm) | L (mm) | L/l | S (mm²) | L/S (mm⁻¹) | Ra (μm) | Presence/absence of catalyst | Presence/absence of particulates | Accumulated amount ratio of ashes |
|---|---|---|---|---|---|---|---|---|---|
| Reference Example 4 | 2.39 | 500 | 209.2 | 5.71 | 87.53 | 0.5 | Yes | No | 0.12 |
| Reference Example 5 | 1.49 | 100 | 67.1 | 2.22 | 45.04 | 0.5 | No | No | 0.25 |
| Reference Example 6 | 1.49 | 100 | 67.1 | 2.22 | 45.04 | 0.5 | Yes | No | 0.23 |
| Reference Example 7 | 1.49 | 300 | 201.3 | 2.22 | 135.13 | 0.5 | No | No | 0.15 |
| Reference Example 8 | 1.49 | 300 | 201.3 | 2.22 | 135.13 | 0.5 | Yes | No | 0.12 |
| Reference Example 9 | 1.49 | 500 | 335.6 | 2.22 | 225.22 | 0.5 | No | No | 0.17 |
| Reference Example 10 | 1.49 | 500 | 335.6 | 2.22 | 225.22 | 0.5 | Yes | No | 0.15 |
| Reference Example 11 | 1.22 | 100 | 82.0 | 1.49 | 67.19 | 0.5 | No | No | 0.28 |
| Reference Example 12 | 1.22 | 100 | 82.0 | 1.49 | 67.19 | 0.5 | Yes | No | 0.26 |
| Reference Example 13 | 1.22 | 300 | 245.9 | 1.49 | 201.56 | 0.5 | No | No | 0.15 |
| Reference Example 14 | 1.22 | 300 | 245.9 | 1.49 | 201.56 | 0.5 | Yes | No | 0.14 |
| Reference Example 15 | 1.22 | 500 | 409.8 | 1.49 | 335.93 | 0.5 | No | No | 0.20 |
| Reference Example 16 | 1.22 | 500 | 409.8 | 1.49 | 335.93 | 0.5 | Yes | No | 0.17 |

TABLE 6

| | l (mm) | L (mm) | L/l | S (mm²) | L/S (mm⁻¹) | Ra (μm) | Presence/absence of catalyst | Presence/absence of particulates | Accumulated amount ratio of ashes |
|---|---|---|---|---|---|---|---|---|---|
| Comparative Example 22 | 2.39 | 300 | 125.5 | 5.71 | 52.52 | 120 | Yes | No | 0.82 |
| Comparative Example 23 | 2.39 | 500 | 209.2 | 5.71 | 87.53 | 120 | Yes | No | 0.85 |
| Comparative Example 24 | 2.39 | 100 | 41.8 | 5.71 | 17.51 | 10 | No | Yes | 0.25 |
| Comparative Example 25 | 2.39 | 100 | 41.8 | 5.71 | 17.51 | 1 | No | Yes | 0.30 |
| Comparative Example 26 | 2.39 | 100 | 41.8 | 5.71 | 17.51 | 0.5 | No | Yes | 0.34 |
| Comparative Example 27 | 2.39 | 100 | 41.8 | 5.71 | 17.51 | 120 | Yes | Yes | 0.75 |
| Comparative Example 28 | 2.39 | 100 | 41.8 | 5.71 | 17.51 | 100 | Yes | Yes | 0.20 |
| Comparative Example 29 | 2.39 | 100 | 41.8 | 5.71 | 17.51 | 50 | Yes | Yes | 0.24 |
| Comparative Example 30 | 2.39 | 100 | 41.8 | 5.71 | 17.51 | 10 | Yes | Yes | 0.23 |
| Comparative Example 31 | 2.39 | 100 | 41.8 | 5.71 | 17.51 | 1 | Yes | Yes | 0.28 |
| Comparative Example 32 | 2.39 | 100 | 41.8 | 5.71 | 17.51 | 0.5 | Yes | Yes | 0.30 |
| Comparative Example 33 | 2.39 | 1200 | 502.1 | 5.71 | 210.8 | 120 | No | Yes | 0.96 |
| Comparative Example 34 | 2.39 | 1200 | 502.1 | 5.71 | 210.8 | 100 | No | Yes | 0.42 |
| Comparative Example 35 | 2.39 | 1200 | 502.1 | 5.71 | 210.8 | 50 | No | Yes | 0.43 |
| Comparative Example 36 | 2.39 | 1200 | 502.1 | 5.71 | 210.8 | 10 | No | Yes | 0.48 |
| Comparative Example 37 | 2.39 | 1200 | 502.1 | 5.71 | 210.8 | 1 | No | Yes | 0.49 |
| Comparative Example 38 | 2.39 | 1200 | 502.1 | 5.71 | 210.8 | 0.5 | No | Yes | 0.52 |
| Comparative Example 39 | 2.39 | 1200 | 502.1 | 5.71 | 210.8 | 120 | Yes | Yes | 0.93 |
| Comparative Example 40 | 2.39 | 1200 | 502.1 | 5.71 | 210.8 | 100 | Yes | Yes | 0.40 |
| Comparative Example 41 | 2.39 | 1200 | 502.1 | 5.71 | 210.8 | 50 | Yes | Yes | 0.41 |
| Comparative Example 42 | 2.39 | 1200 | 502.1 | 5.71 | 210.8 | 10 | Yes | Yes | 0.45 |
| Comparative Example 43 | 2.39 | 1200 | 502.1 | 5.71 | 210.8 | 1 | Yes | Yes | 0.46 |
| Comparative Example 44 | 2.39 | 1200 | 502.1 | 5.71 | 210.8 | 0.5 | Yes | Yes | 0.50 |
| Comparative Example 45 | 1.49 | 100 | 67.1 | 2.22 | 45.04 | 120 | Yes | No | 0.85 |
| Comparative Example 46 | 1.49 | 300 | 201.3 | 2.22 | 135.13 | 120 | Yes | No | 0.85 |
| Comparative Example 47 | 1.49 | 500 | 335.6 | 2.22 | 225.22 | 120 | Yes | No | 0.89 |
| Comparative Example 48 | 1.22 | 100 | 82.0 | 1.49 | 67.19 | 120 | Yes | No | 0.87 |
| Comparative Example 49 | 1.22 | 300 | 245.9 | 1.49 | 201.56 | 120 | Yes | No | 0.90 |
| Comparative Example 50 | 1.22 | 500 | 409.8 | 1.49 | 335.93 | 120 | Yes | No | 0.85 |

As shown in Tables 3 and 4, in the honeycomb filters relating to Examples 25 to 72, hardly any particulates were accumulated on the partition wall, and with respect to the ashes, almost all of them were separated from the partition wall and moved toward the exhaust gas outlet side.

In contrast, as shown in Table 5, in the honeycomb filters relating to Reference Examples 1 to 16, although hardly any particulates were accumulated on the partition wall, ashes remained on the partition wall on the exhaust gas inlet side of the through hole.

Moreover, as shown in Table 6, in the honeycomb filters relating to Comparative Examples 24 to 44, many particulates were left on the partition wall without having been burned completely, and ashes remained on the partition wall on the exhaust gas inlet side of the through hole.

As clearly indicated by the results shown in Table 3 to 6, in the case where the longest side l of the through hole of the honeycomb filter and the length L of the porous ceramic member are set within a range of 60≦L/l≦500, with the area S of the through hole of the honeycomb filter and the length L of the porous ceramic member being set within a range of 20≦L/S≦400, it is possible to burn and remove the particulates accumulated on the partition wall almost completely through the regenerating process of the honeycomb filter, and when the surface roughness Ra on the inner wall of the through hole is also set in a range of 1 to 10 μm, residual ashes accumulated on the partition wall are allowed to easily come off, and in the regenerating process, it becomes possible to easily move ashes through the through hole by using gases that are flown into the through hole.

EXAMPLES 73 TO 88, REFERENCE EXAMPLES 17 TO 20, AND COMPARATIVE EXAMPLES 51 TO 66

Each of the honeycomb filters relating to Examples 25, 26, 29, 30, Reference Examples 1 and 2, and Comparative Examples 25 and 31 was placed in the casing of the exhaust gas purifying device as shown in FIG. 4 by using the method as explained in the detailed description of the invention so that an exhaust gas purifying device was manufactured. In the vicinity of the end of the casing on the exhaust gas inlet side of the exhaust gas purifying device, a pump, which enables air (oxygen concentration: 21%), an oxygen-nitrogen mixed gas having an oxygen concentration of 6% or an oxygen-nitrogen mixed gas having an oxygen concentration of 4% to flow into the honeycomb filter at a desired flow-in rate in the regenerating process of the honeycomb filter, and a back pressure sensor, which measures a pressure loss in the honeycomb filter, were installed.

Here, as shown in Table 7, in the regenerating process of the honeycomb filter, air (oxygen concentration: 21%), an oxygen-nitrogen mixed gas having an oxygen concentration of 6% or an oxygen-nitrogen mixed gas having an oxygen concentration of 4% was flown into the honeycomb filter, and the flow-in rates thereof were respectively set to 0.3 m/sec, 1.0 m/sec and 0.2 m/sec.

Each of the exhaust gas purifying devices manufactured in Examples 73 to 88, Reference Examples 17 to 20 and Comparative Examples 51 to 66 was installed in an exhaust gas passage of an engine, and subjected to evaluation tests in which collecting processes of particulates and regenerating processes of honeycomb filters were carried out repeatedly 100 times, so that the pressure loss in the initial stage of each honeycomb filter after each of the regenerating processes was measured. Moreover, after the evaluation tests, each of the honeycomb filters that had been used in each of the exhaust gas purifying devices was then taken out and cut; thus, the ratio of accumulated amounts of ashes (B/A) between the accumulated amount of ashes (A) in the vicinity of the end on the exhaust gas outlet side and the accumulated amount of ashes (B) in the vicinity of the end on the exhaust gas inlet side was measured. Here, the accumulated amount was measured by measuring the thickness of ashes.

The results thereof are shown in Table 7.

TABLE 7

| | Filter | Oxygen concentration of flow-in gas (%) | Flow-in rate (m/sec) | Accumulated amount ratio of ashes |
|---|---|---|---|---|
| Example 73 | Example 25 | 21 | 0.3 | 0.10 |
| Example 74 | Example 25 | 21 | 1.0 | 0.04 |
| Example 75 | Example 26 | 21 | 0.3 | 0.18 |
| Example 76 | Example 26 | 21 | 1.0 | 0.10 |
| Example 77 | Example 29 | 21 | 0.3 | 0.09 |
| Example 78 | Example 29 | 21 | 1.0 | 0.03 |
| Example 79 | Example 30 | 21 | 0.3 | 0.15 |
| Example 80 | Example 30 | 21 | 1.0 | 0.09 |
| Example 81 | Example 25 | 6 | 0.3 | 0.13 |
| Example 82 | Example 25 | 6 | 1.0 | 0.08 |
| Example 83 | Example 26 | 6 | 0.3 | 0.23 |
| Example 84 | Example 26 | 6 | 1.0 | 0.18 |
| Example 85 | Example 29 | 6 | 0.3 | 0.13 |
| Example 86 | Example 29 | 6 | 1.0 | 0.06 |
| Example 87 | Example 30 | 6 | 0.3 | 0.20 |
| Example 88 | Example 30 | 6 | 1.0 | 0.18 |
| Reference Example 17 | Reference Example 1 | 21 | 0.3 | 0.28 |
| Reference Example 18 | Reference Example 1 | 21 | 1.0 | 0.19 |
| Reference Example 19 | Reference Example 2 | 21 | 0.3 | 0.25 |
| Reference Example 20 | Reference Example 2 | 21 | 1.0 | 0.18 |
| Comparative Example 51 | Example 25 | 21 | 0.2 | 0.77 |
| Comparative Example 52 | Example 26 | 21 | 0.2 | 0.79 |
| Comparative Example 53 | Example 29 | 21 | 0.2 | 0.74 |
| Comparative Example 54 | Example 30 | 21 | 0.2 | 0.76 |
| Comparative Example 55 | Comparative Example 25 | 21 | 0.3 | 0.35 |
| Comparative Example 56 | Comparative Example 25 | 21 | 1.0 | 0.28 |
| Comparative Example 57 | Comparative Example 31 | 21 | 0.3 | 0.33 |
| Comparative Example 58 | Comparative Example 31 | 21 | 1.0 | 0.27 |
| Comparative Example 59 | Example 25 | 4 | 0.3 | 0.38 |
| Comparative Example 60 | Example 25 | 4 | 1.0 | 0.42 |
| Comparative Example 61 | Example 26 | 4 | 0.3 | 0.48 |
| Comparative Example 62 | Example 26 | 4 | 1.0 | 0.52 |
| Comparative Example 63 | Example 29 | 4 | 0.3 | 0.35 |
| Comparative Example 64 | Example 29 | 4 | 1.0 | 0.40 |
| Comparative Example 65 | Example 30 | 4 | 0.3 | 0.45 |
| Comparative Example 66 | Example 30 | 4 | 1.0 | 0.50 |

As shown in Table 7, in the honeycomb filters of the exhaust gas purifying devices relating to Examples 73 to 88, hardly any ashes were accumulated on the partition wall on the exhaust gas inlet side and the center portion of the through hole, while some ashes were accumulated on the exhaust gas outlet side of the through hole. Moreover, in the honeycomb filters relating to Examples 73 to 88, the relationship between the number of regenerating processes of the honeycomb filter and the initial pressure loss was almost the same as that of Example 17, and as shown in FIG. 10, the initial pressure loss increases gradually in the quadric curve, each time the regenerating process is repeated, so that it is possible to maintain a low level in the initial pressure loss for a long time.

Therefore, in the exhaust gas purifying devices relating to Examples 73 to 88, it is possible to maintain a wide filtering-permissible area in the honeycomb filter even after the above-mentioned evaluation tests; thus, it becomes possible to prevent the initial pressure loss of the honeycomb filter from becoming too high after the regenerating processes, and consequently to continuously use the filter even after the above-mentioned evaluation tests.

In contrast, in the case of the honeycomb filters relating to Examples 17 to 20, the ashes remained on the partition wall on the exhaust gas inlet side of the through hole. Moreover, with respect to the relationship between the number of regenerating processes and the initial pressure loss of each of the honeycomb filters relating to Examples 17 to 20, the almost same relationship as that of Comparative Example 12 was obtained, and as shown in FIG. 10, the initial pressure loss linearly increases comparatively abruptly, each time the regenerating process is repeated; thus, the initial pressure loss becomes higher quickly.

Therefore, in the case of the exhaust gas purifying devices relating to Comparative Examples 17 to 20, clogging occurs in the partition wall of the honeycomb filter due to ashes after the above-mentioned evaluation tests to cause a high initial pressure loss in the honeycomb filter; consequently, the honeycomb filter needs to be washed through water-washing or the like after the evaluation tests, making it impossible to use the filter continuously.

In the case of the honeycomb filter of each of the exhaust gas purifying devices relating to Comparative Examples 51 to 66, although a portion of ashes was accumulated on the exhaust gas outlet side of the through hole, ashes were left on the partition wall on the exhaust gas inlet side and the center portion of the through hole together with many particulates to easily make the initial pressure loss after the regenerating process higher; thus, the particulate-regenerating process needs to be carried out more frequently in comparison with the exhaust gas purifying devices relating to Examples 73 to 88. Moreover, although the exhaust gas purifying devices relating to Comparative Examples 51 to 66 require no washing process of the honeycomb filter through water-washing or the like immediately after the evaluation test, these devices require the washing process in a shorter period of time in comparison with the exhaust gas purifying devices relating to Examples 73 to 88.

As clearly indicated by the results shown in Table 7, in the regenerating process of the honeycomb filter in the exhaust gas purifying device using the honeycomb filter of the present invention, by setting the flow-in rate of gases to flow into the honeycomb filter to 0.3 m/sec or more, it becomes possible to move residual ashes on the partition wall toward the exhaust gas outlet side of the through hole, to maintain a wide filtering-permissible area in the partition wall, and consequently to use the honeycomb filter continuously for a long time.

Moreover, in the case where, for example, the flow-in rate of gases to flow into the honeycomb filter is set to 0.3 m/sec or more in the regenerating process of the honeycomb filter, it is not possible to move residual ashes on the partition wall toward the exhaust gas outlet side of the through hole, without using the honeycomb filter of the present invention; consequently, it is not possible to use the filter for a long time.

Moreover, when the oxygen concentration of gases to be flown into the honeycomb filter is low, the particulates are not sufficiently burned to remain thereon; thus, the accumulated amount of ashes becomes higher.

INDUSTRIAL APPLICABILITY

The honeycomb filters for purifying exhaust gases according to the first and second aspects of the present invention are as described above; therefore, in a honeycomb filter regenerating process, it is possible to almost completely burn and remove particulates accumulated on the wall portion, and, also, to allow residual ashes on the wall portion to easily move inside the through hole because the ashes can be easily separated from the wall portion.

Moreover, the exhaust gas purifying device of the present invention is as described above, which makes it possible to maintain a wide filtering-permissible area in the wall portion even after continuous particulate collecting and regenerating processes of the honeycomb filter; thus, it becomes possible to prevent the initial pressure loss of the honeycomb filter from becoming too high after the regenerating processes and, consequently, to use the honeycomb filter continuously for a long time.

The invention claimed is:

1. A honeycomb filter for purifying exhaust gases comprising:
a columnar body comprising porous ceramic and having a plurality of through holes extending in parallel with one another in a length direction of said columnar body, said columnar body having a wall portion interposed between said through holes and configured to filter particulates in exhaust gases,
wherein said plurality of through holes has a length 1 which is a longest side in a cross section perpendicular to said length direction of said columnar body, said columnar body has a length L in said length direction of said columnar body, said length L and said length 1 satisfy: $60 \leq L/1 \leq 500$, and said wall portion has a surface roughness Ra as defined by JIS B 0601 which satisfies: $Ra \leq 100$ μm.

2. A honeycomb filter for purifying exhaust gases comprising:
a columnar body comprising porous ceramic and having a plurality of through holes extending in parallel with one another in a length direction of said columnar body, said columnar body having a wall portion interposed between said through holes and configured to filter particulates in exhaust gases,
wherein said plurality of through holes has an area S which is a cross section area perpendicular to said length direction of said columnar body, said columnar body has a length L in said length direction of said columnar body, and said area S and said length L satisfy: $20 \leq L/S \leq 400$, and said wall portion has a surface roughness Ra as defined by JIS B 0601) which satisfies: $Ra \leq 100$ μm.

3. The honeycomb filter for purifying exhaust gases according to claim 1, wherein said surface roughness Ra satisfies: $1.0 \text{ μm} \leq Ra \leq 100 \text{ μm}$.

4. The honeycomb filter for purifying exhaust gases according to claim 2, wherein said surface roughness Ra satisfies: $1.0 \text{ μm} \leq Ra \leq 100 \text{ μm}$.

5. The honeycomb filter for purifying exhaust gases according to claim 1, wherein said columnar body comprises a plurality of rectangular columnar porous ceramic members combined through an adhesive layer, and said plurality of through holes and said wall portion are formed in each of said rectangular columnar porous.

6. The honeycomb filter for purifying exhaust gases according to claim 2, wherein said columnar body comprises a plurality of rectangular columnar porous ceramic members combined through an adhesive layer, and said plurality of through holes and said wall portion are formed in each of said rectangular columnar porous ceramic members.

7. The honeycomb filter for purifying exhaust gases according to claim 1, further comprising a catalyst provided in said columnar body.

8. The honeycomb filter for purifying exhaust gases according to claim 2, further comprising a catalyst provided in said columnar body.

9. An exhaust gas purifying device comprising:
a casing configured to be connected to an exhaust gas passage of an internal combustion engine and holding the honeycomb filter for purifying exhaust gases according to claim 1 therein; and
a heating device provided inside said casing,
wherein said heating device is configured to heat and introduce exhaust gases at a flow-in rate of 0.3 m/sec or more and an oxygen concentration of 6% or more.

10. An exhaust gas purifying device comprising:
a casing configured to be connected to an exhaust gas passage of an internal combustion engine and holding the honeycomb filter for purifying exhaust gases according to claim 2 therein; and
a heating device provided inside said casing,
wherein said heating device is configured to heat and introduce exhaust gases at a flow-in rate of 0.3 m/sec or more and an oxygen concentration of 6% or more.

11. The honeycomb filter for purifying exhaust gases according to claim 1, wherein said columnar body comprises a single sintered body.

12. The honeycomb filter for purifying exhaust gases according to claim 2, wherein said columnar body comprises a single sintered body.

* * * * *

UNITED STATES PATENT AND TRADEMARK OFFICE
CERTIFICATE OF CORRECTION

PATENT NO. : 7,427,308 B2  
APPLICATION NO. : 10/506438  
DATED : September 23, 2008  
INVENTOR(S) : Noriyuki Taoka et al.

It is certified that error appears in the above-identified patent and that said Letters Patent is hereby corrected as shown below:

Column 46, line 29, change "1" to (alphabet letter) --l--;
        line 33, change "1" to (alphabet letter) --l--;
        line 51, change "JIS B 0601)" to --JIS B 0601--; and
        line 63, change "porous." to --porous ceramic members.--

Signed and Sealed this

Tenth Day of February, 2009

JOHN DOLL  
*Acting Director of the United States Patent and Trademark Office*